(12) United States Patent
Wingard

(10) Patent No.: US 6,295,318 B1
(45) Date of Patent: Sep. 25, 2001

(54) METHOD AND SYSTEM FOR INCREASING THE DATA RATE OVER TWISTED COPPER PAIRS AND OTHER BANDWIDTH-LIMITED DEDICATED COMMUNICATIONS FACILITIES

(76) Inventor: Peter F. Wingard, 216 Heatherdown Rd., Decatur, GA (US) 30030

(*) Notice: Subject to any disclaimer, the term of this patent is extended or adjusted under 35 U.S.C. 154(b) by 0 days.

(21) Appl. No.: 09/252,864

(22) Filed: Feb. 18, 1999

Related U.S. Application Data

(63) Continuation-in-part of application No. 09/185,907, filed on Nov. 3, 1998, now abandoned.
(60) Provisional application No. 60/064,083, filed on Nov. 3, 1997.

(51) Int. Cl.[7] .............................. H04L 7/04; H03K 7/04; H03K 9/04
(52) U.S. Cl. ..................... 375/239; 375/362; 332/112; 329/313; 370/213; 370/503; 359/186
(58) Field of Search ..................................... 375/239, 260, 375/354, 362; 332/112; 329/313; 370/213, 503; 359/137, 186

(56) References Cited

U.S. PATENT DOCUMENTS

| | | |
|---|---|---|
| 2,262,838 | 11/1941 | Deloraine et al. . |
| 2,429,613 | 10/1947 | Deloraine et al. . |
| 2,786,100 | 3/1957 | Earp . |
| 3,626,379 | 12/1971 | Wrigley . |
| 3,854,010 | 12/1974 | Yoshino et al. . |
| 3,924,074 | 12/1975 | Peterson . |
| 4,206,316 | 6/1980 | Burnsweig et al. . |
| 4,719,623 | 1/1988 | Leyser . |
| 4,736,393 | 4/1988 | Grimes et al. . |
| 4,939,752 | 7/1990 | Literati et al. . |
| 5,241,961 | 9/1993 | Henry . |
| 5,243,626 | 9/1993 | Devon et al. . |
| 5,475,455 | 12/1995 | Hibino et al. . |
| 5,633,742 | 5/1997 | Shipley . |
| 5,684,871 * | 11/1997 | Devon et al. ..................... 375/239 |
| 5,691,665 | 11/1997 | Ohtani . |
| 5,801,695 | 9/1998 | Townshend . |
| 5,825,815 * | 10/1998 | Tsai et al. ........................ 375/220 |

* cited by examiner

Primary Examiner—Amanda T. Le
(74) Attorney, Agent, or Firm—Dougherty & Clements LLP

(57) ABSTRACT

A system and associated methods that use separate paths to send amplified data. The method expands, or amplifies, the amount of data that can be transmitted over a dedicated bandwidth-limited communications medium by using a first channel for transmitting clock synchronization pulses and transmitting the data as pulse position modulated (PPM) data over a second separate bandwidth-limited communication channel. Data for transmission is encoded by determining if the period of a pulse encroaches into the frame of the subsequent pulse. In response to a determination of encroachment, one or both of the pulses are inverted and time shifted to eliminate the encroachment. In the event that inversion of one or both of the pulses does not eliminate the encroachment, a blank is inserted between the two pulses.

22 Claims, 24 Drawing Sheets

FIG. 8A

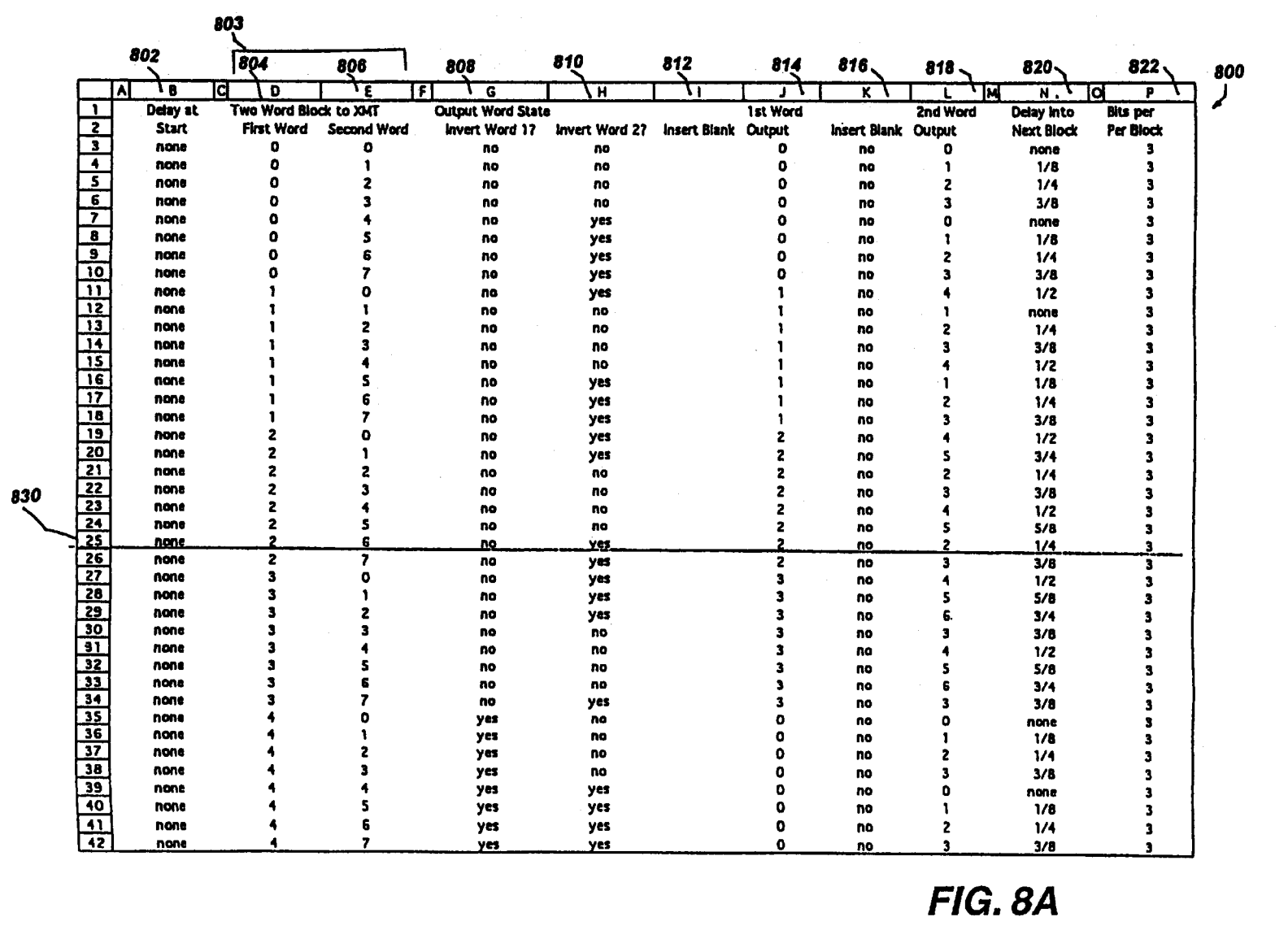

| Row | Delay at Start | Two Word Block to XAT - First Word | Two Word Block to XAT - Second Word | Output Word State - Invert Word 1? | Output Word State - Invert Word 2? | Insert Blank | 1st Word Output | Insert Blank | 2nd Word Output | Delay Into Next Block | Bits per Block |
|---|---|---|---|---|---|---|---|---|---|---|---|
| 1 | none | 0 | 0 | no | no | | 0 | no | 0 | none | 3 |
| 2 | none | 0 | 1 | no | no | | 0 | no | 1 | 1/8 | 3 |
| 3 | none | 0 | 2 | no | no | | 0 | no | 2 | 1/4 | 3 |
| 4 | none | 0 | 3 | no | no | | 0 | no | 3 | 3/8 | 3 |
| 5 | none | 0 | 4 | no | yes | | 0 | no | 0 | none | 3 |
| 6 | none | 0 | 5 | no | yes | | 0 | no | 1 | 1/8 | 3 |
| 7 | none | 0 | 6 | no | yes | | 0 | no | 2 | 1/4 | 3 |
| 8 | none | 0 | 7 | no | yes | | 0 | no | 3 | 3/8 | 3 |
| 9 | none | 1 | 0 | no | no | | 1 | no | 0 | 1/2 | 3 |
| 10 | none | 1 | 1 | no | no | | 1 | no | 1 | 1/4 | 3 |
| 11 | none | 1 | 2 | no | no | | 1 | no | 2 | 3/8 | 3 |
| 12 | none | 1 | 3 | no | no | | 1 | no | 3 | 1/2 | 3 |
| 13 | none | 1 | 4 | no | yes | | 1 | no | 0 | none | 3 |
| 14 | none | 1 | 5 | no | yes | | 1 | no | 1 | 1/4 | 3 |
| 15 | none | 1 | 6 | no | yes | | 1 | no | 2 | 3/8 | 3 |
| 16 | none | 1 | 7 | no | yes | | 1 | no | 3 | 1/2 | 3 |
| 17 | none | 2 | 0 | no | no | | 2 | no | 0 | 1/8 | 3 |
| 18 | none | 2 | 1 | no | no | | 2 | no | 1 | 1/4 | 3 |
| 19 | none | 2 | 2 | no | no | | 2 | no | 2 | 3/8 | 3 |
| 20 | none | 2 | 3 | no | no | | 2 | no | 3 | 1/2 | 3 |
| 21 | none | 2 | 4 | no | yes | | 2 | no | 4 | 1/4 | 3 |
| 22 | none | 2 | 5 | no | yes | | 2 | no | 5 | 3/8 | 3 |
| 23 | none | 2 | 6 | no | yes | | 2 | no | 4 | 1/2 | 3 |
| 24 | none | 2 | 7 | no | yes | | 2 | no | 5 | 5/8 | 3 |
| 25 | none | 2 | 6 | no | yes | | 2 | no | 2 | 1/4 | 3 |
| 26 | none | 2 | 7 | no | yes | | 3 | no | 3 | 3/8 | 3 |
| 27 | none | 3 | 0 | no | yes | | 3 | no | 4 | 1/2 | 3 |
| 28 | none | 3 | 1 | no | yes | | 3 | no | 5 | 5/8 | 3 |
| 29 | none | 3 | 2 | no | yes | | 3 | no | 4 | 3/4 | 3 |
| 30 | none | 3 | 3 | no | yes | | 3 | no | 5 | 1/2 | 3 |
| 31 | none | 3 | 4 | yes | yes | | 3 | no | 4 | 5/8 | 3 |
| 32 | none | 3 | 5 | yes | yes | | 3 | no | 5 | 3/4 | 3 |
| 33 | none | 3 | 6 | yes | yes | | 3 | no | 6 | 3/8 | 3 |
| 34 | none | 3 | 7 | yes | yes | | 3 | no | 3 | 1/2 | 3 |
| 35 | none | 4 | 0 | yes | no | | 0 | no | 0 | none | 3 |
| 36 | none | 4 | 1 | yes | no | | 0 | no | 1 | 1/8 | 3 |
| 37 | none | 4 | 2 | yes | no | | 0 | no | 2 | 1/4 | 3 |
| 38 | none | 4 | 3 | yes | no | | 0 | no | 3 | 3/8 | 3 |
| 39 | none | 4 | 4 | yes | yes | | 0 | no | 0 | none | 3 |
| 40 | none | 4 | 5 | yes | yes | | 0 | no | 1 | 1/8 | 3 |
| 41 | none | 4 | 6 | yes | yes | | 0 | no | 2 | 1/4 | 3 |
| 42 | none | 4 | 7 | yes | yes | | 0 | no | 3 | 3/8 | 3 |

| A | B | C | D | E | F | G | H | I | J | K | L | M | N | O | P |
|---|---|---|---|---|---|---|---|---|---|---|---|---|---|---|---|
| 43 | none | | 5 | 0 | | yes | yes | | 1 | no | 4 | | 1/2 | | 3 |
| 44 | none | | 5 | 1 | | yes | no | | 1 | no | 1 | | 1/8 | | 3 |
| 45 | none | | 5 | 2 | | yes | no | | 1 | no | 2 | | 1/4 | | 3 |
| 46 | none | | 5 | 3 | | yes | no | | 1 | no | 3 | | 3/8 | | 3 |
| 47 | none | | 5 | 4 | | yes | no | | 1 | no | 4 | | 1/2 | | 3 |
| 48 | none | | 5 | 5 | | yes | yes | | 1 | no | 1 | | 1/8 | | 3 |
| 49 | none | | 5 | 6 | | yes | yes | | 1 | no | 2 | | 1/4 | | 3 |
| 50 | none | | 5 | 7 | | yes | yes | | 1 | no | 3 | | 3/8 | | 3 |
| 51 | none | | 6 | 0 | | yes | yes | | 2 | no | 4 | | 1/2 | | 3 |
| 52 | none | | 6 | 1 | | yes | yes | | 2 | no | 5 | | 5/8 | | 3 |
| 53 | none | | 6 | 2 | | yes | no | | 2 | no | 2 | | 1/4 | | 3 |
| 54 | none | | 6 | 3 | | yes | no | | 2 | no | 3 | | 3/8 | | 3 |
| 55 | none | | 6 | 4 | | yes | no | | 2 | no | 4 | | 1/2 | | 3 |
| 56 | none | | 6 | 5 | | yes | yes | | 2 | no | 5 | | 5/8 | | 3 |
| 57 | none | | 6 | 6 | | yes | yes | | 3 | no | 2 | | 1/4 | | 3 |
| 58 | none | | 6 | 7 | | yes | yes | | 3 | no | 3 | | 3/8 | | 3 |
| 59 | none | | 7 | 0 | | yes | yes | | 3 | no | 4 | | 1/2 | | 3 |
| 60 | none | | 7 | 1 | | yes | yes | | 3 | no | 5 | | 5/8 | | 3 |
| 61 | none | | 7 | 2 | | yes | no | | 3 | no | 6 | | 3/4 | | 3 |
| 62 | none | | 7 | 3 | | yes | no | | 3 | no | 3 | | 3/8 | | 3 |
| 63 | none | | 7 | 4 | | yes | no | | 4 | no | 4 | | 1/2 | | 3 |
| 64 | none | | 7 | 5 | | yes | yes | | 4 | no | 5 | | 5/8 | | 3 |
| 65 | none | | 7 | 6 | | yes | yes | | 4 | no | 6 | | 3/4 | | 3 |
| 66 | none | | 7 | 7 | | yes | yes | | 4 | no | 7 | | 7/8 | | 3 |
| 67 | 1/8 | | 0 | 0 | | yes | yes | | 4 | no | 4 | | 1/2 | | 3 |
| 68 | 1/8 | | 0 | 1 | | yes | no | | 1 | no | 5 | | 5/8 | | 3 |
| 69 | 1/8 | | 0 | 2 | | yes | no | | 1 | no | 6 | | 3/4 | | 3 |
| 70 | 1/8 | | 0 | 3 | | yes | no | | 1 | no | 7 | | 7/8 | | 3 |
| 71 | 1/8 | | 0 | 4 | | yes | yes | | 1 | no | 4 | | 1/2 | | 3 |
| 72 | 1/8 | | 0 | 5 | | no | no | | 1 | no | 1 | | none | | 3 |
| 73 | 1/8 | | 0 | 6 | | no | no | | 1 | no | 2 | | 1/4 | | 3 |
| 74 | 1/8 | | 0 | 7 | | no | no | | 1 | no | 3 | | 3/8 | | 3 |
| 75 | 1/8 | | 1 | 0 | | yes | no | | 1 | no | 4 | | 1/2 | | 3 |
| 76 | 1/8 | | 1 | 1 | | no | no | | 1 | no | 5 | | 5/8 | | 3 |
| 77 | 1/8 | | 1 | 2 | | no | no | | 1 | no | 6 | | 3/4 | | 3 |
| 78 | 1/8 | | 1 | 3 | | no | no | | 1 | no | 7 | | 7/8 | | 3 |
| 79 | 1/8 | | 1 | 4 | | no | no | | 1 | no | 4 | | 1/2 | | 3 |
| 80 | 1/8 | | 1 | 5 | | no | no | | 1 | no | 5 | | 5/8 | | 3 |
| 81 | 1/8 | | 1 | 6 | | no | no | | 1 | no | 6 | | 3/4 | | 3 |
| 82 | 1/8 | | 2 | 7 | | no | no | | 2 | no | 7 | | 7/8 | | 3 |
| 83 | 1/8 | | 2 | 0 | | yes | yes | | 2 | no | 4 | | 1/2 | | 3 |
| 84 | 1/8 | | 2 | 1 | | no | yes | | 2 | no | 5 | | 3/4 | | 3 |

*FIG. 8B*

| A | B | C | D | E | F | G | H | I | J | K | L | M | N | O | P |
|---|---|---|---|---|---|---|---|---|---|---|---|---|---|---|---|
| 85 | 1/8 | | 2 | 2 | | no | no | | 2 | no | 2 | | 1/4 | | 3 |
| 86 | 1/8 | | 2 | 3 | | no | no | | 2 | no | 3 | | 3/8 | | 3 |
| 87 | 1/8 | | 2 | 4 | | no | no | | 2 | no | 4 | | 1/2 | | 3 |
| 88 | 1/8 | | 2 | 5 | | no | no | | 2 | no | 5 | | 5/8 | | 3 |
| 89 | 1/8 | | 2 | 6 | | no | no | | 2 | no | 6 | | 3/4 | | 3 |
| 90 | 1/8 | | 2 | 7 | | no | yes | | 2 | no | 7 | | 7/8 | | 3 |
| 91 | 1/8 | | 3 | 0 | | no | yes | | 3 | no | 4 | | 1/2 | | 3 |
| 92 | 1/8 | | 3 | 1 | | no | yes | | 3 | no | 5 | | 5/8 | | 3 |
| 93 | 1/8 | | 3 | 2 | | no | no | | 3 | no | 6 | | 3/4 | | 3 |
| 94 | 1/8 | | 3 | 3 | | no | no | | 3 | no | 3 | | 3/8 | | 3 |
| 95 | 1/8 | | 3 | 4 | | no | no | | 3 | no | 4 | | 1/2 | | 3 |
| 96 | 1/8 | | 3 | 5 | | no | no | | 4 | no | 5 | | 5/8 | | 3 |
| 97 | 1/8 | | 3 | 6 | | no | no | | 4 | no | 6 | | 3/4 | | 3 |
| 98 | 1/8 | | 3 | 7 | | no | no | | 4 | no | 7 | | 7/8 | | 3 |
| 99 | 1/8 | | 4 | 0 | | no | yes | | 4 | no | 4 | | 1/2 | | 3 |
| 100 | 1/8 | | 4 | 1 | | no | yes | | 4 | no | 5 | | 5/8 | | 3 |
| 101 | 1/8 | | 4 | 2 | | no | yes | | 4 | no | 6 | | 3/4 | | 3 |
| 102 | 1/8 | | 4 | 3 | | no | yes | | 4 | no | 7 | | 7/8 | | 3 |
| 103 | 1/8 | | 4 | 4 | | no | no | | 5 | no | 4 | | 1/2 | | 3 |
| 104 | 1/8 | | 4 | 5 | | no | no | | 5 | no | 5 | | 5/8 | | 3 |
| 105 | 1/8 | | 4 | 6 | | no | yes | | 5 | no | 6 | | 3/4 | | 3 |
| 106 | 1/8 | | 5 | 7 | | no | yes | | 1 | no | 7 | | 7/8 | | 3 |
| 107 | 1/8 | | 5 | 0 | | no | yes | | 5 | no | 4 | | 1/2 | | 3 |
| 108 | 1/8 | | 5 | 1 | | no | no | | 5 | no | 5 | | 5/8 | | 3 |
| 109 | 1/8 | | 5 | 2 | | no | no | | 2 | no | 6 | | 3/4 | | 3 |
| 110 | 1/8 | | 5 | 3 | | no | no | | 2 | no | 7 | | 7/8 | | 3 |
| 111 | 1/8 | | 5 | 4 | | yes | no | | 6 | no | 4 | | 1/2 | | 3 |
| 112 | 1/8 | | 5 | 5 | | no | yes | | 2 | no | 5 | | 5/8 | | 3 |
| 113 | 1/8 | | 5 | 6 | | no | yes | | 6 | no | 6 | | 3/4 | | 3 |
| 114 | 1/8 | | 6 | 7 | | yes | yes | | 6 | no | 7 | | 7/8 | | 3 |
| 115 | 1/8 | | 6 | 0 | | yes | yes | | 2 | no | 4 | | 1/2 | | 3 |
| 116 | 1/8 | | 6 | 1 | | yes | no | | 6 | no | 5 | | 5/8 | | 3 |
| 117 | 1/8 | | 6 | 2 | | no | no | | 2 | no | 6 | | 3/4 | | 3 |
| 118 | 1/8 | | 6 | 3 | | no | no | | 6 | no | 7 | | 7/8 | | 3 |
| 119 | 1/8 | | 6 | 4 | | yes | yes | | 2 | no | 4 | | 1/2 | | 3 |
| 120 | 1/8 | | 6 | 5 | | yes | yes | | 6 | no | 5 | | 5/8 | | 3 |
| 121 | 1/8 | | 6 | 6 | | yes | no | | 3 | no | 6 | | 3/4 | | 3 |
| 122 | 1/8 | | 6 | 7 | | no | no | | 6 | no | 7 | | 7/8 | | 3 |
| 123 | 1/8 | | 7 | 0 | | yes | yes | | 3 | no | 4 | | 1/2 | | 3 |
| 124 | 1/8 | | 7 | 1 | | yes | yes | | 3 | no | 5 | | 5/8 | | 3 |
| 125 | 1/8 | | 7 | 2 | | yes | yes | | 3 | no | 6 | | 3/4 | | 3 |
| 126 | 1/8 | | 7 | 3 | | no | yes | | 7 | no | 7 | | 7/8 | | 3 |

FIG. 8C

| A | B | C | D | E | F | G | H | I | J | K | L | M | N | O | P |
|---|---|---|---|---|---|---|---|---|---|---|---|---|---|---|---|
| 127 | 1/8 | | 7 | 4 | | yes | no | | 3 | no | 4 | | 1/2 | | 3 |
| 128 | 1/8 | | 7 | 5 | | yes | no | | 3 | no | 5 | | 5/8 | | 3 |
| 129 | 1/8 | | 7 | 6 | | yes | no | | 3 | no | 6 | | 3/4 | | 3 |
| 130 | 1/8 | | 7 | 7 | | no | no | | 7 | no | 7 | | 7/8 | | 3 |
| 131 | 1/4 | | 0 | 0 | | yes | yes | | 4 | no | 4 | | 1/2 | | 3 |
| 132 | 1/4 | | 0 | 1 | | yes | yes | | 4 | no | 5 | | 5/8 | | 3 |
| 133 | 1/4 | | 0 | 2 | | yes | yes | | 4 | no | 6 | | 3/4 | | 3 |
| 134 | 1/4 | | 0 | 3 | | yes | yes | | 4 | no | 7 | | 7/8 | | 3 |
| 135 | 1/4 | | 0 | 4 | | yes | no | | 4 | no | 4 | | 1/2 | | 3 |
| 136 | 1/4 | | 0 | 5 | | yes | no | | 4 | no | 5 | | 5/8 | | 3 |
| 137 | 1/4 | | 0 | 6 | | yes | no | | 4 | no | 6 | | 3/4 | | 3 |
| 138 | 1/4 | | 0 | 7 | | yes | no | | 4 | no | 7 | | 7/8 | | 3 |
| 139 | 1/4 | | 0 | 0 | | yes | no | | 4 | yes | 0 | | none | | 2 |
| 140 | 1/4 | | 1 | 1 | | yes | yes | | 5 | no | 5 | | 5/8 | | 3 |
| 141 | 1/4 | | 1 | 2 | | yes | yes | | 5 | no | 6 | | 3/4 | | 3 |
| 142 | 1/4 | | 1 | 3 | | yes | yes | | 5 | no | 7 | | 7/8 | | 3 |
| 143 | 1/4 | | 1 | 4 | | yes | yes | | 5 | no | 0 | | none | | 2 |
| 144 | 1/4 | | 1 | 5 | | yes | no | | 5 | yes | 5 | | 5/8 | | 3 |
| 145 | 1/4 | | 1 | 6 | | yes | no | | 5 | no | 6 | | 3/4 | | 3 |
| 146 | 1/4 | | 1 | 7 | | yes | no | | 5 | no | 7 | | 7/8 | | 3 |
| 147 | 1/4 | | 2 | 0 | | no | no | | 2 | no | 4 | | 1/2 | | 3 |
| 148 | 1/4 | | 2 | 1 | | no | yes | | 2 | no | 5 | | 3/4 | | 3 |
| 149 | 1/4 | | 2 | 2 | | no | yes | | 2 | no | 2 | | 3/4 | | 3 |
| 150 | 1/4 | | 2 | 3 | | no | yes | | 2 | no | 3 | | 3/8 | | 3 |
| 151 | 1/4 | | 2 | 4 | | no | yes | | 2 | no | 4 | | 1/2 | | 3 |
| 152 | 1/4 | | 2 | 5 | | no | no | | 2 | no | 5 | | 5/8 | | 3 |
| 153 | 1/4 | | 2 | 6 | | no | no | | 2 | no | 6 | | 3/4 | | 3 |
| 154 | 1/4 | | 2 | 7 | | no | no | | 2 | no | 7 | | 7/8 | | 3 |
| 155 | 1/4 | | 3 | 0 | | no | no | | 3 | no | 4 | | 1/2 | | 3 |
| 156 | 1/4 | | 3 | 1 | | no | yes | | 3 | no | 5 | | 5/8 | | 3 |
| 157 | 1/4 | | 3 | 2 | | no | yes | | 3 | no | 6 | | 3/4 | | 3 |
| 158 | 1/4 | | 3 | 3 | | no | yes | | 3 | no | 3 | | 3/8 | | 3 |
| 159 | 1/4 | | 3 | 4 | | no | no | | 3 | no | 4 | | 1/2 | | 3 |
| 160 | 1/4 | | 3 | 5 | | no | no | | 3 | no | 5 | | 5/8 | | 3 |
| 161 | 1/4 | | 3 | 6 | | no | no | | 3 | no | 6 | | 3/4 | | 3 |
| 162 | 1/4 | | 3 | 7 | | no | no | | 3 | no | 7 | | 7/8 | | 3 |
| 163 | 1/4 | | 4 | 0 | | no | yes | | 4 | no | 4 | | 1/2 | | 3 |
| 164 | 1/4 | | 4 | 1 | | no | yes | | 4 | no | 5 | | 5/8 | | 3 |
| 165 | 1/4 | | 4 | 2 | | no | yes | | 4 | no | 6 | | 3/4 | | 3 |
| 166 | 1/4 | | 4 | 3 | | no | yes | | 4 | no | 7 | | 7/8 | | 3 |
| 167 | 1/4 | | 4 | 4 | | no | no | | 4 | no | 4 | | 1/2 | | 3 |
| 168 | 1/4 | | 4 | 5 | | no | no | | 4 | no | 5 | | 5/8 | | 3 |

*FIG. 8D*

| A | B | C | D | E | F | G | H | I | J | K | L | M | N | O | P |
|---|---|---|---|---|---|---|---|---|---|---|---|---|---|---|---|
| 169 | 1/4 | | 4 | 6 | | no | no | | 4 | no | 6 | | 3/4 | | 3 |
| 170 | 1/4 | | 4 | 7 | | no | no | | 5 | no | 7 | | 7/8 | | 3 |
| 171 | 1/4 | | 5 | 0 | | no | yes | | 5 | no | 4 | | 1/2 | | 3 |
| 172 | 1/4 | | 5 | 1 | | no | yes | | 5 | no | 5 | | 5/8 | | 3 |
| 173 | 1/4 | | 5 | 2 | | no | yes | | 5 | no | 6 | | 3/4 | | 3 |
| 174 | 1/4 | | 5 | 3 | | no | yes | | 5 | no | 7 | | 7/8 | | 3 |
| 175 | 1/4 | | 5 | 4 | | no | yes | | 5 | yes | 0 | | none | | 2 |
| 176 | 1/4 | | 5 | 5 | | no | no | | 5 | no | 5 | | 5/8 | | 3 |
| 177 | 1/4 | | 5 | 6 | | no | no | | 5 | no | 6 | | 3/4 | | 3 |
| 178 | 1/4 | | 5 | 7 | | no | no | | 5 | no | 7 | | 7/8 | | 3 |
| 179 | 1/4 | | 6 | 0 | | yes | yes | | 2 | no | 4 | | 1/2 | | 3 |
| 180 | 1/4 | | 6 | 1 | | yes | yes | | 2 | no | 5 | | 5/8 | | 3 |
| 181 | 1/4 | | 6 | 2 | | no | yes | | 6 | no | 6 | | 3/4 | | 3 |
| 182 | 1/4 | | 6 | 3 | | no | yes | | 6 | no | 7 | | 7/8 | | 3 |
| 183 | 1/4 | | 6 | 4 | | yes | no | | 2 | no | 4 | | 1/2 | | 3 |
| 184 | 1/4 | | 6 | 5 | | yes | no | | 2 | no | 5 | | 5/8 | | 3 |
| 185 | 1/4 | | 6 | 6 | | no | no | | 6 | no | 6 | | 3/4 | | 3 |
| 186 | 1/4 | | 6 | 7 | | no | no | | 6 | no | 7 | | 7/8 | | 3 |
| 187 | 1/4 | | 7 | 0 | | yes | yes | | 3 | no | 4 | | 1/2 | | 3 |
| 188 | 1/4 | | 7 | 1 | | yes | yes | | 3 | no | 5 | | 5/8 | | 3 |
| 189 | 1/4 | | 7 | 2 | | yes | yes | | 3 | no | 6 | | 3/4 | | 3 |
| 190 | 1/4 | | 7 | 3 | | yes | yes | | 3 | no | 7 | | 7/8 | | 3 |
| 191 | 1/4 | | 7 | 4 | | yes | no | | 3 | no | 4 | | 1/2 | | 3 |
| 192 | 1/4 | | 7 | 5 | | yes | no | | 3 | no | 5 | | 5/8 | | 3 |
| 193 | 1/4 | | 7 | 6 | | yes | no | | 3 | no | 6 | | 3/4 | | 3 |
| 194 | 1/4 | | 7 | 7 | | yes | no | | 7 | no | 7 | | 7/8 | | 3 |
| 195 | 3/8 | | 0 | 0 | | yes | yes | | 4 | no | 4 | | 1/2 | | 3 |
| 196 | 3/8 | | 0 | 1 | | yes | yes | | 4 | no | 5 | | 5/8 | | 3 |
| 197 | 3/8 | | 0 | 2 | | yes | yes | | 4 | no | 6. | | 3/4 | | 3 |
| 198 | 3/8 | | 0 | 3 | | yes | yes | | 4 | no | 7 | | 7/8 | | 3 |
| 199 | 3/8 | | 0 | 4 | | yes | yes | | 4 | no | 4 | | 1/2 | | 3 |
| 200 | 3/8 | | 0 | 5 | | yes | yes | | 4 | no | 5 | | 5/8 | | 3 |
| 201 | 3/8 | | 0 | 6 | | yes | yes | | 4 | no | 6 | | 3/4 | | 3 |
| 202 | 3/8 | | 0 | 7 | | yes | yes | | 4 | no | 7 | | 7/8 | | 3 |
| 203 | 3/8 | | 1 | 0 | | yes | no | | 5 | yes | 0 | | none | | 2 |
| 204 | 3/8 | | 1 | 1 | | yes | yes | | 5 | no | 5 | | 5/8 | | 3 |
| 205 | 3/8 | | 1 | 2 | | yes | yes | | 5 | no | 6 | | 3/4 | | 3 |
| 206 | 3/8 | | 1 | 3 | | yes | yes | | 5 | no | 7 | | 7/8 | | 3 |
| 207 | 3/8 | | 1 | 4 | | yes | yes | | 5 | yes | 0 | | none | | 2 |
| 208 | 3/8 | | 1 | 5 | | yes | no | | 5 | no | 5 | | 5/8 | | 3 |
| 209 | 3/8 | | 1 | 6 | | yes | no | | 5 | no | 6 | | 3/4 | | 3 |
| 210 | 3/8 | | 1 | 7 | | yes | no | | 5 | no | 7 | | 7/8 | | 3 |

*FIG. 8E*

| A | B | C | D | E | F | G | H | I | J | K | L | M | N | O | P |
|---|---|---|---|---|---|---|---|---|---|---|---|---|---|---|---|
| 211 | 3/8 | | 2 | 0 | | yes | no | | 6 | yes | 0 | | none | | 2 |
| 212 | 3/8 | | 2 | 1 | | yes | no | | 6 | yes | 1 | | 1/8 | | 2 |
| 213 | 3/8 | | 2 | 2 | | yes | yes | | 6 | no | 6 | | 5/8 | | 3 |
| 214 | 3/8 | | 2 | 3 | | yes | yes | | 6 | no | 7 | | 7/8 | | 3 |
| 215 | 3/8 | | 2 | 4 | | yes | yes | | 6 | yes | 0 | | none | | 2 |
| 216 | 3/8 | | 2 | 5 | | yes | yes | | 6 | yes | 1 | | 1/8 | | 2 |
| 217 | 3/8 | | 2 | 6 | | yes | no | | 6 | no | 6 | | 3/4 | | 3 |
| 218 | 3/8 | | 2 | 7 | | yes | yes | | 3 | no | 7 | | 7/8 | | 3 |
| 219 | 3/8 | | 3 | 0 | | no | yes | | 3 | no | 4 | | 1/2 | | 3 |
| 220 | 3/8 | | 3 | 1 | | no | yes | | 3 | no | 5 | | 5/8 | | 3 |
| 221 | 3/8 | | 3 | 2 | | no | no | | 3 | no | 6 | | 3/4 | | 3 |
| 222 | 3/8 | | 3 | 3 | | no | no | | 3 | no | 3 | | 3/8 | | 3 |
| 223 | 3/8 | | 3 | 4 | | no | no | | 3 | no | 4 | | 1/2 | | 3 |
| 224 | 3/8 | | 3 | 5 | | no | yes | | 3 | no | 5 | | 5/8 | | 3 |
| 225 | 3/8 | | 3 | 6 | | no | yes | | 3 | no | 6 | | 3/4 | | 3 |
| 226 | 3/8 | | 3 | 7 | | no | yes | | 3 | no | 7 | | 7/8 | | 3 |
| 227 | 3/8 | | 4 | 0 | | no | no | | 4 | no | 4 | | 1/2 | | 3 |
| 228 | 3/8 | | 4 | 1 | | no | no | | 4 | no | 5 | | 5/8 | | 3 |
| 229 | 3/8 | | 4 | 2 | | no | no | | 4 | no | 6 | | 3/4 | | 3 |
| 230 | 3/8 | | 4 | 3 | | no | no | | 4 | no | 7 | | 7/8 | | 3 |
| 231 | 3/8 | | 4 | 4 | | no | yes | | 4 | no | 4 | | 1/2 | | 3 |
| 232 | 3/8 | | 4 | 5 | | no | yes | | 4 | no | 5 | | 5/8 | | 3 |
| 233 | 3/8 | | 4 | 6 | | no | yes | | 4 | no | 6 | | 3/4 | | 3 |
| 234 | 3/8 | | 4 | 7 | | no | yes | | 4 | no | 7 | | 7/8 | | 3 |
| 235 | 3/8 | | 5 | 0 | | no | no | | 5 | yes | 0 | | none | | 2 |
| 236 | 3/8 | | 5 | 1 | | no | no | | 5 | no | 5 | | 5/8 | | 3 |
| 237 | 3/8 | | 5 | 2 | | no | no | | 5 | no | 6 | | 3/4 | | 3 |
| 238 | 3/8 | | 5 | 3 | | no | no | | 5 | no | 7 | | 7/8 | | 3 |
| 239 | 3/8 | | 5 | 4 | | no | yes | | 5 | yes | 0 | | none | | 2 |
| 240 | 3/8 | | 5 | 5 | | no | yes | | 5 | yes | 1 | | 1/8 | | 3 |
| 241 | 3/8 | | 5 | 6 | | no | yes | | 5 | no | 6 | | 3/4 | | 3 |
| 242 | 3/8 | | 5 | 7 | | no | yes | | 5 | no | 7 | | 7/8 | | 3 |
| 243 | 3/8 | | 6 | 0 | | no | no | | 6 | yes | 0 | | none | | 2 |
| 244 | 3/8 | | 6 | 1 | | no | no | | 6 | yes | 1 | | 1/8 | | 3 |
| 245 | 3/8 | | 6 | 2 | | no | no | | 6 | no | 6 | | 3/4 | | 3 |
| 246 | 3/8 | | 6 | 3 | | no | no | | 6 | no | 7 | | 7/8 | | 3 |
| 247 | 3/8 | | 6 | 4 | | no | yes | | 6 | yes | 0 | | none | | 2 |
| 248 | 3/8 | | 6 | 5 | | no | yes | | 6 | yes | 1 | | 1/8 | | 2 |
| 249 | 3/8 | | 6 | 6 | | no | yes | | 6 | no | 6 | | 3/4 | | 3 |
| 250 | 3/8 | | 6 | 7 | | no | yes | | 6 | no | 7 | | 7/8 | | 3 |
| 251 | 3/8 | | 7 | 0 | | yes | no | | 3 | no | 4 | | 1/2 | | 2 |
| 252 | 3/8 | | 7 | 1 | | yes | yes | | 3 | no | 5 | | 5/8 | | 3 |

FIG. 8F

| A | B | C | D | E | F | G | H | I | J | K | L | M | N | O | P |
|---|---|---|---|---|---|---|---|---|---|---|---|---|---|---|---|
| 253 | 3/8 | | 7 | 2 | | yes | yes | | 3 | no | 6 | | 3/4 | | 3 |
| 254 | 3/8 | | 7 | 3 | | no | yes | | 7 | no | 7 | | 7/8 | | 3 |
| 255 | 3/8 | | 7 | 4 | | yes | no | | 3 | no | 4 | | 1/2 | | 3 |
| 256 | 3/8 | | 7 | 5 | | yes | no | | 3 | no | 5 | | 5/8 | | 3 |
| 257 | 3/8 | | 7 | 6 | | yes | no | | 7 | no | 6 | | 3/4 | | 3 |
| 258 | 3/8 | | 7 | 7 | | no | no | | 7 | no | 7 | | 7/8 | | 3 |
| 259 | 1/2 | | 0 | 0 | | yes | yes | | 4 | no | 4 | | 1/2 | | 3 |
| 260 | 1/2 | | 0 | 1 | | yes | yes | | 4 | no | 5 | | 5/8 | | 3 |
| 261 | 1/2 | | 0 | 2 | | yes | yes | | 4 | no | 6 | | 3/4 | | 3 |
| 262 | 1/2 | | 0 | 3 | | yes | yes | | 4 | no | 7 | | 7/8 | | 3 |
| 263 | 1/2 | | 0 | 4 | | yes | no | | 4 | no | 4 | | 1/2 | | 3 |
| 264 | 1/2 | | 0 | 5 | | yes | no | | 4 | no | 5 | | 5/8 | | 3 |
| 265 | 1/2 | | 0 | 6 | | yes | no | | 4 | no | 6 | | 3/4 | | 3 |
| 266 | 1/2 | | 0 | 7 | | yes | no | | 4 | no | 7 | | 7/8 | | 3 |
| 267 | 1/2 | | 1 | 0 | | yes | no | | 5 | yes | 0 | | none | | 2 |
| 268 | 1/2 | | 1 | 1 | | yes | yes | | 5 | no | 5 | | 5/8 | | 3 |
| 269 | 1/2 | | 1 | 2 | | yes | yes | | 5 | no | 6 | | 3/4 | | 3 |
| 270 | 1/2 | | 1 | 3 | | yes | yes | | 5 | no | 7 | | 7/8 | | 3 |
| 271 | 1/2 | | 1 | 4 | | yes | no | | 5 | no | 0 | | none | | 2 |
| 272 | 1/2 | | 1 | 5 | | yes | no | | 6 | no | 5 | | 5/8 | | 3 |
| 273 | 1/2 | | 1 | 6 | | yes | no | | 6 | no | 6 | | 3/4 | | 3 |
| 274 | 1/2 | | 1 | 7 | | yes | no | | 6 | no | 7 | | 7/8 | | 3 |
| 275 | 1/2 | | 2 | 0 | | yes | no | | 6 | yes | 0 | | none | | 2 |
| 276 | 1/2 | | 2 | 1 | | yes | yes | | 6 | no | 1 | | 1/8 | | 3 |
| 277 | 1/2 | | 2 | 2 | | yes | yes | | 6 | no | 6 | | 3/4 | | 3 |
| 278 | 1/2 | | 2 | 3 | | yes | yes | | 6 | no | 7 | | 7/8 | | 3 |
| 279 | 1/2 | | 2 | 4 | | yes | no | | 7 | yes | 0 | | none | | 2 |
| 280 | 1/2 | | 2 | 5 | | yes | yes | | 7 | yes | 1 | | 1/8 | | 3 |
| 281 | 1/2 | | 2 | 6 | | yes | yes | | 7 | no | 6 | | 3/4 | | 3 |
| 282 | 1/2 | | 2 | 7 | | yes | yes | | 7 | no | 7 | | 7/8 | | 3 |
| 283 | 1/2 | | 3 | 0 | | yes | no | | 7 | yes | 0 | | none | | 2 |
| 284 | 1/2 | | 3 | 1 | | yes | yes | | 7 | yes | 1 | | 1/8 | | 3 |
| 285 | 1/2 | | 3 | 2 | | yes | yes | | 7 | yes | 2 | | 1/4 | | 2 |
| 286 | 1/2 | | 3 | 3 | | yes | yes | | 7 | no | 7 | | 7/8 | | 3 |
| 287 | 1/2 | | 3 | 4 | | yes | no | | 4 | yes | 0 | | none | | 2 |
| 288 | 1/2 | | 3 | 5 | | yes | yes | | 4 | yes | 1 | | 1/8 | | 3 |
| 289 | 1/2 | | 3 | 6 | | yes | yes | | 4 | yes | 2 | | 1/4 | | 2 |
| 290 | 1/2 | | 3 | 7 | | yes | yes | | 4 | yes | 7 | | 7/8 | | 3 |
| 291 | 1/2 | | 4 | 0 | | no | no | | 4 | no | 4 | | 1/2 | | 2 |
| 292 | 1/2 | | 4 | 1 | | no | yes | | 4 | no | 5 | | 5/8 | | 2 |
| 293 | 1/2 | | 4 | 2 | | no | yes | | 4 | no | 6 | | 3/4 | | 3 |
| 294 | 1/2 | | 4 | 3 | | no | yes | | 4 | no | 7 | | 7/8 | | 3 |

FIG. 8G

| A | B | C | D | E | F | G | H | I | J | K | L | M | N | O | P |
|---|---|---|---|---|---|---|---|---|---|---|---|---|---|---|---|
| 295 | 1/2 | | 4 | 4 | | no | no | | 4 | no | 4 | | 1/2 | | 3 |
| 296 | 1/2 | | 4 | 5 | | no | no | | 4 | no | 5 | | 5/8 | | 3 |
| 297 | 1/2 | | 4 | 6 | | no | no | | 4 | no | 6 | | 3/4 | | 3 |
| 298 | 1/2 | | 4 | 7 | | no | no | | 4 | no | 7 | | 7/8 | | 3 |
| 299 | 1/2 | | 5 | 0 | | no | yes | | 5 | no | 4 | | 1/2 | | 3 |
| 300 | 1/2 | | 5 | 1 | | no | yes | | 5 | no | 5 | | 5/8 | | 3 |
| 301 | 1/2 | | 5 | 2 | | no | yes | | 5 | no | 6 | | 3/4 | | 3 |
| 302 | 1/2 | | 5 | 3 | | no | yes | | 5 | no | 7 | | 7/8 | | 3 |
| 303 | 1/2 | | 5 | 4 | | no | no | | 5 | yes | 0 | | none | | 2 |
| 304 | 1/2 | | 5 | 5 | | no | no | | 5 | no | 5 | | 5/8 | | 3 |
| 305 | 1/2 | | 5 | 6 | | no | no | | 5 | no | 6 | | 3/4 | | 3 |
| 306 | 1/2 | | 5 | 7 | | no | no | | 5 | no | 7 | | 7/8 | | 3 |
| 307 | 1/2 | | 6 | 0 | | no | no | | 6 | no | 0 | | none | | 2 |
| 308 | 1/2 | | 6 | 1 | | no | yes | | 6 | yes | 1 | | 1/8 | | 2 |
| 309 | 1/2 | | 6 | 2 | | no | yes | | 6 | yes | 6 | | 3/4 | | 3 |
| 310 | 1/2 | | 6 | 3 | | no | yes | | 6 | no | 7 | | 7/8 | | 3 |
| 311 | 1/2 | | 6 | 4 | | no | yes | | 6 | no | 0 | | none | | 2 |
| 312 | 1/2 | | 6 | 5 | | no | no | | 6 | yes | 1 | | 1/8 | | 2 |
| 313 | 1/2 | | 6 | 6 | | no | no | | 6 | yes | 6 | | 3/4 | | 3 |
| 314 | 1/2 | | 6 | 7 | | no | no | | 6 | no | 7 | | 7/8 | | 3 |
| 315 | 1/2 | | 7 | 0 | | no | no | yes | 7 | yes | 0 | | none | | 2 |
| 316 | 1/2 | | 7 | 1 | | no | yes | yes | 7 | yes | 1 | | 1/8 | | 2 |
| 317 | 1/2 | | 7 | 2 | | no | yes | yes | 7 | yes | 2 | | 1/4 | | 2 |
| 318 | 1/2 | | 7 | 3 | | no | yes | yes | 7 | no | 7 | | 7/8 | | 3 |
| 319 | 1/2 | | 7 | 4 | | no | yes | yes | 7 | yes | 0 | | none | | 2 |
| 320 | 1/2 | | 7 | 5 | | no | no | yes | 7 | yes | 1 | | 1/8 | | 2 |
| 321 | 1/2 | | 7 | 6 | | no | no | yes | 7 | yes | 2 | | 1/4 | | 2 |
| 322 | 1/2 | | 7 | 7 | | no | no | yes | 7 | no | 7 | | 7/8 | | 3 |
| 323 | 5/8 | | 0 | 0 | | no | no | no | 0 | no | 0 | | none | | 2 |
| 324 | 5/8 | | 0 | 1 | | no | no | no | 0 | no | 1 | | 1/8 | | 2 |
| 325 | 5/8 | | 0 | 2 | | no | no | no | 0 | no | 2 | | 1/4 | | 2 |
| 326 | 5/8 | | 0 | 3 | | no | no | no | 0 | no | 3 | | 3/8 | | 2 |
| 327 | 5/8 | | 0 | 4 | | no | yes | no | 0 | yes | 0 | | none | | 2 |
| 328 | 5/8 | | 0 | 5 | | no | yes | no | 0 | yes | 1 | | 1/8 | | 2 |
| 329 | 5/8 | | 0 | 6 | | no | yes | no | 0 | yes | 2 | | 1/4 | | 2 |
| 330 | 5/8 | | 0 | 7 | | no | yes | no | 0 | yes | 3 | | 3/8 | | 2 |
| 331 | 5/8 | | 1 | 0 | | yes | no | | 5 | no | 0 | | none | | 2 |
| 332 | 5/8 | | 1 | 1 | | yes | yes | | 5 | no | 5 | | 5/8 | | 3 |
| 333 | 5/8 | | 1 | 2 | | yes | yes | | 5 | no | 6 | | 3/4 | | 3 |
| 334 | 5/8 | | 1 | 3 | | yes | yes | | 5 | no | 7 | | 7/8 | | 3 |
| 335 | 5/8 | | 1 | 4 | | yes | yes | | 5 | yes | 0 | | none | | 2 |
| 336 | 5/8 | | 1 | 5 | | yes | no | | 5 | no | 5 | | 5/8 | | 3 |

| A | B | C | D | E | F | G | H | I | J | K | L | M | N | O | P |
|---|---|---|---|---|---|---|---|---|---|---|---|---|---|---|---|
| 337 | 5/8 | | 1 | 6 | | yes | no | no | 5 | no | 6 | | 3/4 | | 3 |
| 338 | 5/8 | | 1 | 7 | | yes | no | no | 5 | no | 7 | | 7/8 | | 3 |
| 339 | 5/8 | | 2 | 0 | | yes | no | no | 6 | yes | 0 | | none | | 2 |
| 340 | 5/8 | | 2 | 1 | | yes | yes | no | 6 | no | 1 | | 1/8 | | 2 |
| 341 | 5/8 | | 2 | 2 | | yes | yes | no | 6 | yes | 6 | | 3/4 | | 3 |
| 342 | 5/8 | | 2 | 3 | | yes | yes | no | 6 | yes | 7 | | 7/8 | | 2 |
| 343 | 5/8 | | 2 | 4 | | yes | yes | no | 6 | no | 0 | | none | | 3 |
| 344 | 5/8 | | 2 | 5 | | yes | yes | no | 6 | no | 1 | | 1/8 | | 2 |
| 345 | 5/8 | | 2 | 6 | | yes | no | no | 6 | no | 6 | | 3/4 | | 2 |
| 346 | 5/8 | | 2 | 7 | | yes | no | no | 6 | no | 7 | | 7/8 | | 3 |
| 347 | 5/8 | | 3 | 0 | | yes | no | no | 7 | yes | 0 | | none | | 2 |
| 348 | 5/8 | | 3 | 1 | | yes | no | no | 7 | yes | 1 | | 1/4 | | 2 |
| 349 | 5/8 | | 3 | 2 | | yes | yes | no | 7 | yes | 2 | | 7/8 | | 3 |
| 350 | 5/8 | | 3 | 3 | | yes | yes | no | 7 | no | 7 | | 7/8 | | 2 |
| 351 | 5/8 | | 3 | 4 | | yes | yes | no | 7 | no | 0 | | none | | 3 |
| 352 | 5/8 | | 3 | 5 | | yes | yes | no | 7 | no | 1 | | 1/8 | | 2 |
| 353 | 5/8 | | 3 | 6 | | yes | yes | no | 7 | no | 2 | | 1/4 | | 2 |
| 354 | 5/8 | | 3 | 7 | | yes | yes | no | 7 | no | 7 | | 7/8 | | 2 |
| 355 | 5/8 | | 4 | 0 | | yes | no | yes | 0 | no | 0 | | none | | 3 |
| 356 | 5/8 | | 4 | 1 | | yes | no | yes | 0 | no | 1 | | 1/8 | | 2 |
| 357 | 5/8 | | 4 | 2 | | yes | no | yes | 0 | no | 2 | | 1/4 | | 2 |
| 358 | 5/8 | | 4 | 3 | | no | yes | yes | 0 | no | 3 | | 3/8 | | 2 |
| 359 | 5/8 | | 4 | 4 | | no | yes | yes | 0 | no | 4 | | 1/2 | | 2 |
| 360 | 5/8 | | 4 | 5 | | no | yes | yes | 0 | no | 5 | | 5/8 | | 2 |
| 361 | 5/8 | | 4 | 6 | | no | yes | yes | 5 | no | 6 | | 3/4 | | 2 |
| 362 | 5/8 | | 4 | 7 | | no | yes | no | 5 | yes | 7 | | 7/8 | | 3 |
| 363 | 5/8 | | 5 | 0 | | no | yes | | 5 | no | 0 | | none | | 2 |
| 364 | 5/8 | | 5 | 1 | | no | yes | | 5 | no | 5 | | 5/8 | | 3 |
| 365 | 5/8 | | 5 | 2 | | no | yes | | 5 | no | 6 | | 3/4 | | 3 |
| 366 | 5/8 | | 5 | 3 | | no | yes | | 5 | yes | 7 | | 7/8 | | 3 |
| 367 | 5/8 | | 5 | 4 | | no | yes | | 5 | no | 0 | | none | | 2 |
| 368 | 5/8 | | 5 | 5 | | no | yes | | 6 | no | 1 | | 1/8 | | 3 |
| 369 | 5/8 | | 6 | 6 | | no | yes | | 6 | yes | 6 | | 3/4 | | 2 |
| 370 | 5/8 | | 6 | 7 | | no | yes | | 6 | no | 7 | | 7/8 | | 3 |
| 371 | 5/8 | | 6 | 0 | | no | yes | | 6 | no | 0 | | none | | 3 |
| 372 | 5/8 | | 6 | 1 | | no | yes | | 6 | yes | 1 | | 1/8 | | 3 |
| 373 | 5/8 | | 6 | 2 | | no | yes | | 6 | yes | 6 | | 3/4 | | 2 |
| 374 | 5/8 | | 6 | 3 | | no | no | | 6 | yes | 7 | | 7/8 | | 2 |
| 375 | 5/8 | | 6 | 4 | | no | no | | 6 | no | 0 | | none | | 3 |
| 376 | 5/8 | | 6 | 5 | | no | no | | 6 | no | 1 | | 1/8 | | 2 |
| 377 | 5/8 | | 6 | 6 | | no | yes | | 6 | no | 6 | | 3/4 | | 3 |
| 378 | 5/8 | | 6 | 7 | | no | no | | 6 | no | 7 | | 7/8 | | 3 |

| A | B | C | D | E | F | G | H | I | J | K | L | M | N | O | P |
|---|---|---|---|---|---|---|---|---|---|---|---|---|---|---|---|
| 379 | 5/8 |  | 7 | 0 |  | no | no |  | 7 | yes | 0 |  | none |  | 2 |
| 380 | 5/8 |  | 7 | 1 |  | no | no |  | 7 | yes | 1 |  | 1/8 |  | 2 |
| 381 | 5/8 |  | 7 | 2 |  | no | no |  | 7 | yes | 2 |  | 1/4 |  | 2 |
| 382 | 5/8 |  | 7 | 3 |  | no | yes |  | 7 | no | 7 |  | 7/8 |  | 3 |
| 383 | 5/8 |  | 7 | 4 |  | no | yes |  | 7 | yes | 0 |  | none |  | 2 |
| 384 | 5/8 |  | 7 | 5 |  | no | yes |  | 7 | yes | 1 |  | 1/8 |  | 2 |
| 385 | 5/8 |  | 7 | 6 |  | no | yes |  | 7 | yes | 2 |  | 1/4 |  | 2 |
| 386 | 5/8 |  | 7 | 7 |  | no | no | yes | 0 | no | 7 |  | 7/8 |  | 3 |
| 387 | 3/4 |  | 0 | 0 |  | no | no | yes | 0 | no | 0 |  | none |  | 2 |
| 388 | 3/4 |  | 0 | 1 |  | no | no | yes | 0 | no | 1 |  | 1/8 |  | 2 |
| 389 | 3/4 |  | 0 | 2 |  | no | no | yes | 0 | no | 2 |  | 1/4 |  | 2 |
| 390 | 3/4 |  | 0 | 3 |  | no | no | yes | 0 | no | 3 |  | 3/8 |  | 2 |
| 391 | 3/4 |  | 1 | 0 |  | no | yes | yes | 1 | no | 0 |  | none |  | 2 |
| 392 | 3/4 |  | 1 | 1 |  | no | yes | yes | 1 | no | 1 |  | 1/8 |  | 2 |
| 393 | 3/4 |  | 1 | 2 |  | no | yes | yes | 1 | no | 2 |  | 1/4 |  | 2 |
| 394 | 3/4 |  | 1 | 3 |  | no | yes | yes | 1 | no | 3 |  | 3/8 |  | 2 |
| 395 | 3/4 |  | 1 | 4 |  | no | yes | yes | 1 | no | 4 |  | 1/2 |  | 2 |
| 396 | 3/4 |  | 1 | 5 |  | no | yes | yes | 1 | no | 1 |  | 1/8 |  | 2 |
| 397 | 3/4 |  | 1 | 6 |  | no | yes | yes | 1 | no | 2 |  | 1/4 |  | 2 |
| 398 | 3/4 |  | 1 | 7 |  | no | yes | yes | 1 | no | 3 |  | 3/8 |  | 2 |
| 399 | 3/4 |  | 2 | 0 |  | no | no | yes | 6 | no | 4 |  | 1/2 |  | 2 |
| 400 | 3/4 |  | 2 | 1 |  | no | yes | yes | 6 | no | 1 |  | 1/8 |  | 2 |
| 401 | 3/4 |  | 2 | 2 |  | no | yes | no | 6 | no | 2 |  | 1/4 |  | 2 |
| 402 | 3/4 |  | 2 | 3 |  | no | yes | no | 6 | no | 3 |  | 3/8 |  | 2 |
| 403 | 3/4 |  | 2 | 4 |  | yes | no | no | 6 | no | 4 |  | 1/2 |  | 2 |
| 404 | 3/4 |  | 2 | 5 |  | yes | no | no | 6 | yes | 0 |  | none |  | 2 |
| 405 | 3/4 |  | 2 | 6 |  | yes | no | no | 6 | yes | 1 |  | 1/8 |  | 2 |
| 406 | 3/4 |  | 2 | 7 |  | yes | yes | no | 6 | yes | 6 |  | 3/4 |  | 3 |
| 407 | 3/4 |  | 3 | 0 |  | yes | yes | no | 7 | yes | 7 |  | 7/8 |  | 3 |
| 408 | 3/4 |  | 3 | 1 |  | yes | no | no | 7 | yes | 0 |  | none |  | 2 |
| 409 | 3/4 |  | 3 | 2 |  | yes | yes | no | 7 | yes | 1 |  | 1/8 |  | 2 |
| 410 | 3/4 |  | 3 | 3 |  | yes | yes | no | 7 | yes | 6 |  | 3/4 |  | 3 |
| 411 | 3/4 |  | 3 | 4 |  | yes | yes | no | 7 | yes | 7 |  | 7/8 |  | 3 |
| 412 | 3/4 |  | 3 | 5 |  | yes | no | no | 7 | no | 0 |  | none |  | 2 |
| 413 | 3/4 |  | 3 | 6 |  | yes | yes | no | 7 | no | 1 |  | 1/8 |  | 2 |
| 414 | 3/4 |  | 3 | 7 |  | yes | yes | no | 7 | no | 2 |  | 1/4 |  | 2 |
| 415 | 3/4 |  | 3 | 4 |  | yes | yes | no | 7 | yes | 7 |  | 7/8 |  | 3 |
| 416 | 3/4 |  | 3 | 5 |  | yes | yes | no | 7 | yes | 0 |  | none |  | 2 |
| 417 | 3/4 |  | 3 | 6 |  | yes | yes | no | 7 | yes | 1 |  | 1/8 |  | 2 |
| 418 | 3/4 |  | 3 | 7 |  | yes | no | yes | 7 | yes | 2 |  | 1/4 |  | 2 |
| 419 | 3/4 |  | 4 | 0 |  | yes | no | yes | 0 | no | 0 |  | none |  | 2 |
| 420 | 3/4 |  | 4 | 1 |  | yes | no | no | 0 | no | 1 |  | 1/8 |  | 2 |

FIG. 8J

| A | B | C | D | E | F | G | H | I | J | K | L | M | N | O | P |
|---|---|---|---|---|---|---|---|---|---|---|---|---|---|---|---|
| 421 | 3/4 | | 4 | 2 | | yes | no | yes | 0 | no | 2 | | 1/4 | | 2 |
| 422 | 3/4 | | 4 | 3 | | yes | no | yes | 0 | no | 3 | | 3/8 | | 2 |
| 423 | 3/4 | | 4 | 4 | | yes | yes | yes | 0 | no | 0 | | none | | 2 |
| 424 | 3/4 | | 4 | 5 | | yes | yes | yes | 0 | no | 1 | | 1/8 | | 2 |
| 425 | 3/4 | | 4 | 6 | | yes | yes | yes | 1 | no | 2 | | 1/4 | | 2 |
| 426 | 3/4 | | 4 | 7 | | yes | yes | yes | 1 | no | 3 | | 3/8 | | 2 |
| 427 | 3/4 | | 4 | 0 | | yes | no | yes | 1 | no | 4 | | 1/2 | | 2 |
| 428 | 3/4 | | 4 | 1 | | yes | no | yes | 1 | no | 1 | | 1/8 | | 2 |
| 429 | 3/4 | | 4 | 2 | | yes | no | yes | 1 | no | 2 | | 1/4 | | 2 |
| 430 | 3/4 | | 4 | 3 | | yes | yes | yes | 1 | no | 3 | | 3/8 | | 2 |
| 431 | 3/4 | | 5 | 4 | | yes | yes | yes | 1 | no | 4 | | 1/2 | | 2 |
| 432 | 3/4 | | 5 | 5 | | yes | yes | no | 1 | no | 1 | | 1/8 | | 2 |
| 433 | 3/4 | | 5 | 6 | | no | yes | no | 6 | yes | 3 | | 3/8 | | 2 |
| 434 | 3/4 | | 5 | 7 | | no | yes | no | 6 | yes | 0 | | none | | 2 |
| 435 | 3/4 | | 5 | 0 | | no | no | no | 6 | no | 1 | | 1/8 | | 3 |
| 436 | 3/4 | | 5 | 1 | | no | no | no | 6 | no | 6 | | 3/4 | | 3 |
| 437 | 3/4 | | 5 | 2 | | no | yes | no | 6 | yes | 7 | | 7/8 | | 2 |
| 438 | 3/4 | | 5 | 3 | | no | yes | no | 6 | yes | 0 | | none | | 3 |
| 439 | 3/4 | | 6 | 4 | | no | yes | no | 7 | no | 1 | | 1/8 | | 3 |
| 440 | 3/4 | | 6 | 5 | | no | no | no | 7 | no | 6 | | 3/4 | | 2 |
| 441 | 3/4 | | 6 | 6 | | no | no | no | 7 | yes | 7 | | 7/8 | | 3 |
| 442 | 3/4 | | 6 | 7 | | no | no | no | 7 | yes | 0 | | none | | 2 |
| 443 | 3/4 | | 6 | 0 | | no | no | no | 7 | yes | 1 | | 1/8 | | 3 |
| 444 | 3/4 | | 6 | 1 | | no | no | no | 7 | yes | 2 | | 1/4 | | 2 |
| 445 | 3/4 | | 6 | 2 | | no | yes | yes | 7 | yes | 7 | | 7/8 | | 2 |
| 446 | 3/4 | | 7 | 3 | | no | yes | yes | 0 | no | 0 | | none | | 3 |
| 447 | 3/4 | | 7 | 4 | | no | yes | yes | 0 | no | 1 | | 1/8 | | 2 |
| 448 | 3/4 | | 7 | 5 | | no | yes | yes | 0 | no | 2 | | 1/4 | | 2 |
| 449 | 3/4 | | 7 | 6 | | no | yes | yes | 0 | no | 3 | | 3/8 | | 2 |
| 450 | 3/4 | | 7 | 7 | | no | no | yes | 0 | no | 0 | | none | | 2 |
| 451 | 3/4 | | 7 | 0 | | no | no | yes | 0 | no | 1 | | 1/8 | | 2 |
| 452 | 3/4 | | 7 | 1 | | no | no | yes | 0 | no | 2 | | 1/4 | | 2 |
| 453 | 3/4 | | 7 | 2 | | no | no | yes | 1 | no | 3 | | 3/8 | | 2 |
| 454 | 3/4 | | 7 | 3 | | no | no | yes | 1 | no | 7 | | 7/8 | | 2 |
| 455 | 3/4 | | 0 | 4 | | no | yes | yes | 1 | no | 0 | | none | | 2 |
| 456 | 7/8 | | 0 | 5 | | no | yes | yes | 0 | no | 1 | | 1/8 | | 2 |
| 457 | 7/8 | | 0 | 6 | | no | yes | yes | 0 | no | 2 | | 1/4 | | 2 |
| 458 | 7/8 | | 0 | 7 | | no | yes | yes | 0 | no | 3 | | 3/8 | | 2 |
| 459 | 7/8 | | 0 | 0 | | no | yes | yes | 0 | no | 4 | | 1/2 | | 2 |
| 460 | 7/8 | | 1 | 1 | | no | no | no | 1 | no | 1 | | none | | 2 |
| 461 | 7/8 | | 1 | 2 | | no | no | yes | 1 | no | 2 | | 1/4 | | 2 |
| 462 | 7/8 | | 1 | 3 | | no | no | yes | 1 | no | 3 | | 3/8 | | 2 |

| A | B | C | D | E | F | G | H | I | J | K | L | M | N | O | P |
|---|---|---|---|---|---|---|---|---|---|---|---|---|---|---|---|
| 463 | 7/8 |  | 1 | 4 |  | no | no | yes | 1 | no | 4 |  | 1/2 |  | 2 |
| 464 | 7/8 |  | 1 | 5 |  | no | yes | yes | 1 | no | 1 |  | 1/8 |  | 2 |
| 465 | 7/8 |  | 1 | 6 |  | no | yes | yes | 1 | no | 2 |  | 1/4 |  | 2 |
| 466 | 7/8 |  | 1 | 7 |  | no | yes | yes | 2 | no | 3 |  | 3/8 |  | 2 |
| 467 | 7/8 |  | 2 | 0 |  | no | yes | yes | 2 | no | 4 |  | 1/2 |  | 2 |
| 468 | 7/8 |  | 2 | 1 |  | no | no | yes | 2 | no | 5 |  | 3/4 |  | 2 |
| 469 | 7/8 |  | 2 | 2 |  | no | no | yes | 2 | no | 2 |  | 1/4 |  | 2 |
| 470 | 7/8 |  | 2 | 3 |  | no | no | yes | 2 | no | 3 |  | 3/8 |  | 2 |
| 471 | 7/8 |  | 2 | 4 |  | no | no | yes | 2 | no | 4 |  | 1/2 |  | 2 |
| 472 | 7/8 |  | 2 | 5 |  | no | yes | yes | 2 | no | 5 |  | 5/8 |  | 2 |
| 473 | 7/8 |  | 2 | 6 |  | no | yes | yes | 2 | no | 2 |  | 1/4 |  | 2 |
| 474 | 7/8 |  | 2 | 7 |  | no | yes | yes | 2 | no | 3 |  | 3/8 |  | 2 |
| 475 | 7/8 |  | 3 | 0 |  | yes | no | no | 7 | yes | 0 |  | none |  | 2 |
| 476 | 7/8 |  | 3 | 1 |  | yes | no | no | 7 | yes | 1 |  | 1/8 |  | 2 |
| 477 | 7/8 |  | 3 | 2 |  | yes | no | no | 7 | yes | 2 |  | 1/4 |  | 2 |
| 478 | 7/8 |  | 3 | 3 |  | yes | no | no | 7 | yes | 3 |  | 3/8 |  | 2 |
| 479 | 7/8 |  | 3 | 4 |  | yes | no | no | 7 | yes | 0 |  | none |  | 2 |
| 480 | 7/8 |  | 3 | 5 |  | yes | yes | yes | 0 | no | 1 |  | 1/8 |  | 2 |
| 481 | 7/8 |  | 3 | 6 |  | yes | yes | yes | 0 | no | 2 |  | 1/4 |  | 2 |
| 482 | 7/8 |  | 3 | 7 |  | yes | yes | yes | 0 | no | 3 |  | 3/8 |  | 2 |
| 483 | 7/8 |  | 4 | 0 |  | yes | yes | yes | 0 | no | 0 |  | none |  | 2 |
| 484 | 7/8 |  | 4 | 1 |  | yes | yes | yes | 0 | no | 1 |  | 1/8 |  | 2 |
| 485 | 7/8 |  | 4 | 2 |  | yes | yes | yes | 1 | no | 2 |  | 1/4 |  | 2 |
| 486 | 7/8 |  | 4 | 3 |  | yes | yes | yes | 1 | no | 3 |  | 3/8 |  | 2 |
| 487 | 7/8 |  | 4 | 4 |  | yes | yes | yes | 1 | no | 4 |  | 1/2 |  | 2 |
| 488 | 7/8 |  | 4 | 5 |  | yes | yes | yes | 1 | no | 1 |  | 1/8 |  | 2 |
| 489 | 7/8 |  | 4 | 6 |  | yes | yes | yes | 1 | no | 2 |  | 1/4 |  | 2 |
| 490 | 7/8 |  | 4 | 7 |  | yes | yes | yes | 1 | no | 3 |  | 3/8 |  | 2 |
| 491 | 7/8 |  | 5 | 0 |  | yes | yes | yes | 1 | no | 4 |  | 1/2 |  | 2 |
| 492 | 7/8 |  | 5 | 1 |  | yes | yes | yes | 2 | no | 1 |  | 1/8 |  | 2 |
| 493 | 7/8 |  | 5 | 2 |  | yes | yes | yes | 2 | no | 2 |  | 1/4 |  | 2 |
| 494 | 7/8 |  | 5 | 3 |  | yes | yes | yes | 2 | no | 3 |  | 3/8 |  | 2 |
| 495 | 7/8 |  | 5 | 4 |  | yes | yes | yes | 2 | no | 4 |  | 1/2 |  | 2 |
| 496 | 7/8 |  | 5 | 5 |  | yes | yes | yes | 2 | no | 1 |  | 1/8 |  | 2 |
| 497 | 7/8 |  | 5 | 6 |  | yes | yes | yes | 2 | no | 2 |  | 1/4 |  | 2 |
| 498 | 7/8 |  | 5 | 7 |  | yes | yes | yes | 2 | no | 3 |  | 3/8 |  | 2 |
| 499 | 7/8 |  | 6 | 0 |  | yes | yes | yes | 2 | no | 4 |  | 1/2 |  | 2 |
| 500 | 7/8 |  | 6 | 1 |  | yes | yes | yes | 2 | no | 5 |  | 5/8 |  | 2 |
| 501 | 7/8 |  | 6 | 2 |  | yes | yes | yes | 2 | no | 2 |  | 1/4 |  | 2 |
| 502 | 7/8 |  | 6 | 3 |  | yes | no | yes | 2 | no | 3 |  | 3/8 |  | 2 |
| 503 | 7/8 |  | 6 | 4 |  | yes | yes | yes | 2 | no | 4 |  | 1/2 |  | 2 |
| 504 | 7/8 |  | 6 | 5 |  | yes | no | yes | 2 | no | 5 |  | 5/8 |  | 2 |

*FIG. 8L*

| A | B | C | D | E | F | G | H | I | J | K | L | M | N | O | P |
|---|---|---|---|---|---|---|---|---|---|---|---|---|---|---|---|
| 505 | 7/8 | | 6 | 6 | | yes | yes | yes | 2 | no | 2 | | 1/4 | | 2 |
| 506 | 7/8 | | 6 | 7 | | yes | yes | yes | 2 | no | 3 | | 3/8 | | 2 |
| 507 | 7/8 | | 7 | 0 | | no | no | no | 7 | yes | 0 | | none | | 2 |
| 508 | 7/8 | | 7 | 1 | | no | no | no | 7 | yes | 1 | | 1/8 | | 2 |
| 509 | 7/8 | | 7 | 2 | | no | yes | no | 7 | yes | 2 | | 3/8 | | 2 |
| 510 | 7/8 | | 7 | 3 | | no | yes | no | 7 | no | 7 | | 7/8 | | 3 |
| 511 | 7/8 | | 7 | 4 | | no | yes | no | 7 | yes | 0 | | none | | 2 |
| 512 | 7/8 | | 7 | 5 | | no | yes | no | 7 | yes | 1 | | 1/8 | | 2 |
| 513 | 7/8 | | 7 | 6 | | no | yes | no | 7 | yes | 2 | | 1/4 | | 2 |
| 514 | 7/8 | | 7 | 7 | | no | no | no | 7 | no | 7 | | 7/8 | | 3 |

*FIG. 8M*

METHOD AND SYSTEM FOR INCREASING THE DATA RATE OVER TWISTED COPPER PAIRS AND OTHER BANDWIDTH-LIMITED DEDICATED COMMUNICATIONS FACILITIES

CROSS REFERENCE TO RELATED APPLICATIONS

This application is a continuation-in-part of application Ser. No. 09/185,907, filed Nov. 3, 1998, now abandoned, which in turn claims priority from provisional application number 60/064,083 filed Nov. 3, 1997.

TECHNICAL FIELD

This invention relates generally to the field of digital data communications, and more particularly relates to a method of increasing the rate of data transmitted over a limited bandwidth medium such as twisted copper pairs by using a modified pulse position modulation scheme and a synchronization signal transmitted over a separate-path communications channel.

BACKGROUND OF THE INVENTION

The amount of digital information that can be transmitted over a communications medium such as copper telephone wires, typically provided as a pair of twisted copper wires, is limited by the inherent bandwidth of the medium. Information to be transmitted digitally is first typically converted into digital pulses. The number of pulses that can be transmitted in one second is limited by the bandwidth of the medium. Limiting the number of pulses that can be transmitted limits the amount of data that can be transmitted. To increase the amount of data that can be transmitted, data encoding schemes were created.

One such scheme is pulse position modulation (PPM). A PPM scheme creates a plurality of symbol positions, with each symbol position corresponding to a predefined value representing the information. Placing a pulse in one of the symbol positions transmits the predefined value. In n-PPM, information is converted into n-bit data, where n is greater than zero. The information is then converted into one of $2^n$ possible pulse values. Each of the values at which a pulse may be placed is referred to as a "symbol position." The unit indicating the n-bit information formed by the $2^n$ symbol positions is referred to as a "frame.".

The number of frames that can be transmitted per unit time is related to the bandwidth of the communications medium. For example, the bandwidth of a twisted copper pair is typically no more than 64 kHz, which corresponds to a channel capacity of 64,000 bits per second. Therefore, there can be up to 64,000 frames available. As an example, in a 3-PPM system transmitted over twisted copper pairs, there are eight possible combinations of 3-bit binary data: 000, 001, 010, 011, 100, 101, 110, and 111. Each frame is divided into eight symbol positions, having the values 0, 1, 2, 3, 4, 5, 6, 7 ($2^3$=8), which correspond to the 3-bit binary data.

For transmission of the 3-bit data with a PPM scheme, a pulse is placed in the corresponding symbol position. In this manner, 3 bits of information are transmitted by a single pulse, as opposed to a single bit of information represented by a single pulse. Therefore, the amount of data transmitted increases by a factor of 3.

Simply increasing the factor n can increase the amount of data transmitted. However, increasing the factor n increases the number of symbol positions, but the number of frames remains the same because of the limited bandwidth of the channel. Necessarily, the width of the individual pulses decreases. This leads to an increase in the required bandwidth of the communications medium used to transmit the PPM signal. However, communications media have a fixed bandwidth. As stated above, for twisted copper pairs, this is typically about 64 kHz for lengths of about 18,000 feet to 24,000 feet. Once the bandwidth limitation of the communications medium is reached, the individual pulses can occur so closely together that the receiver will not be able to resolve one pulse from another.

One possible solution is to switch to a communications medium with a greater bandwidth capacity. However, media with greater bandwidth are typically more expensive than twisted copper pairs and also require more complex transmitters and receivers.

Thus, there is a general need in the art for a method of increasing the amount of data that can be transmitted over a bandwidth-limited communications medium, such as twisted copper pairs, without increasing the required bandwidth and thereby providing improved telecommunications services to the home and office.

SUMMARY OF THE INVENTION

The present invention meets the above-described need by providing a method of increasing the amount of data that can be transmitted over a bandwidth-limited communications medium, such as twisted copper pairs, without increasing the bandwidth requirement of the communications medium. The invention may be referred to as "SPAD," an acronym for Separate Paths to Amplify the Data.

Information that is to be transmitted is first converted into n-bit digital data. A separate communications path is employed for transmitting a synchronization clock pulse (SCP) signal. The number $2^n$ of symbol positions available for transmitting the data is related to the frequency of the SCP signal. The frequency of the pulse synchronization signal and the number of symbol positions are arbitrary and may be determined through testing methods that are beyond the scope of the present invention. The symbol positions are grouped into a plurality of frames, where each frame transmits a single pulse at a rate not exceeding the bandwidth of the channel. Therefore the number of frames is equal to the bandwidth of the system.

For example, in a twisted copper pair having a maximum bandwidth of 64 kHz, the number of frames is equal to 64,000. Each frame is then divided into $2^n$ symbol positions. A pulse is then placed in a symbol position that corresponds to the value of the data contained in the pulse. However, the width of the pulse does not correspond to the width of the symbol position. To ensure that the pulse in a given frame can be resolved from a pulse in an adjacent frame, the pulse width is provided at a predetermined value, preferably no more than one half of the frame width with a duty cycle of 50 percent. This means that the pulse will be "high" for a period equal to one half the frame width and "low" for a period equal to one half the frame width. Using SPAD-3 as an example, there will be eight symbol positions available for each frame. Each pulse will be "high" for four symbol positions and "low" for four symbol positions.

To ensure that the period of a pulse in a given frame does not encroach on the period of a subsequent pulse in a subsequent frame, the subsequent pulse may be inverted. Inverting a pulse means that the value of the pulse is negated relative to zero voltage, and the value is changed to its the complementary value. For SPAD-3, for example, a position of 0 would have an inverted position of 4, a position of 1 would have an inverted position of 5, a position of 2 would have an inverted position of 6, a position of 3 would have an inverted position of 7 a position of 4 would have an inverted position of 0, a position of 5 would have an inverted position of 1, a position of 6 would have an inverted position of 2, and a position of 7 would have an inverted position of 3.

Inverting pulses in this manner increases the data rate without decreasing the duty cycle. Because inverted pulses have negative voltages, the receiving equipment must be capable of detected three voltage levels, a negative voltage level, a zero voltage level, and a positive voltage level. Although the invention is described as negating a pulse relative to a zero voltage reference level, those skilled in the art will appreciate that a pulse may be "negated" relative to a non-zero reference voltage. In this case, a "negative" voltage will be some voltage level less than the reference voltage and a "positive" voltage will be a voltage level greater than the reference voltage.

That the invention improves over the drawbacks of prior PPM transmission systems and accomplishes the advantages described above will become apparent from the following detailed description of the exemplary embodiments and the appended drawings and claims.

BRIEF DESCRIPTION OF THE DRAWINGS

FIG. 8, consisting of FIG. 8A through FIG. 8M, is a table illustrating inversion look-up tables that can be implemented in an alternative embodiment of the invention.

DETAILED DESCRIPTION OF THE PREFERRED EMBODIMENTS

Figure 1:
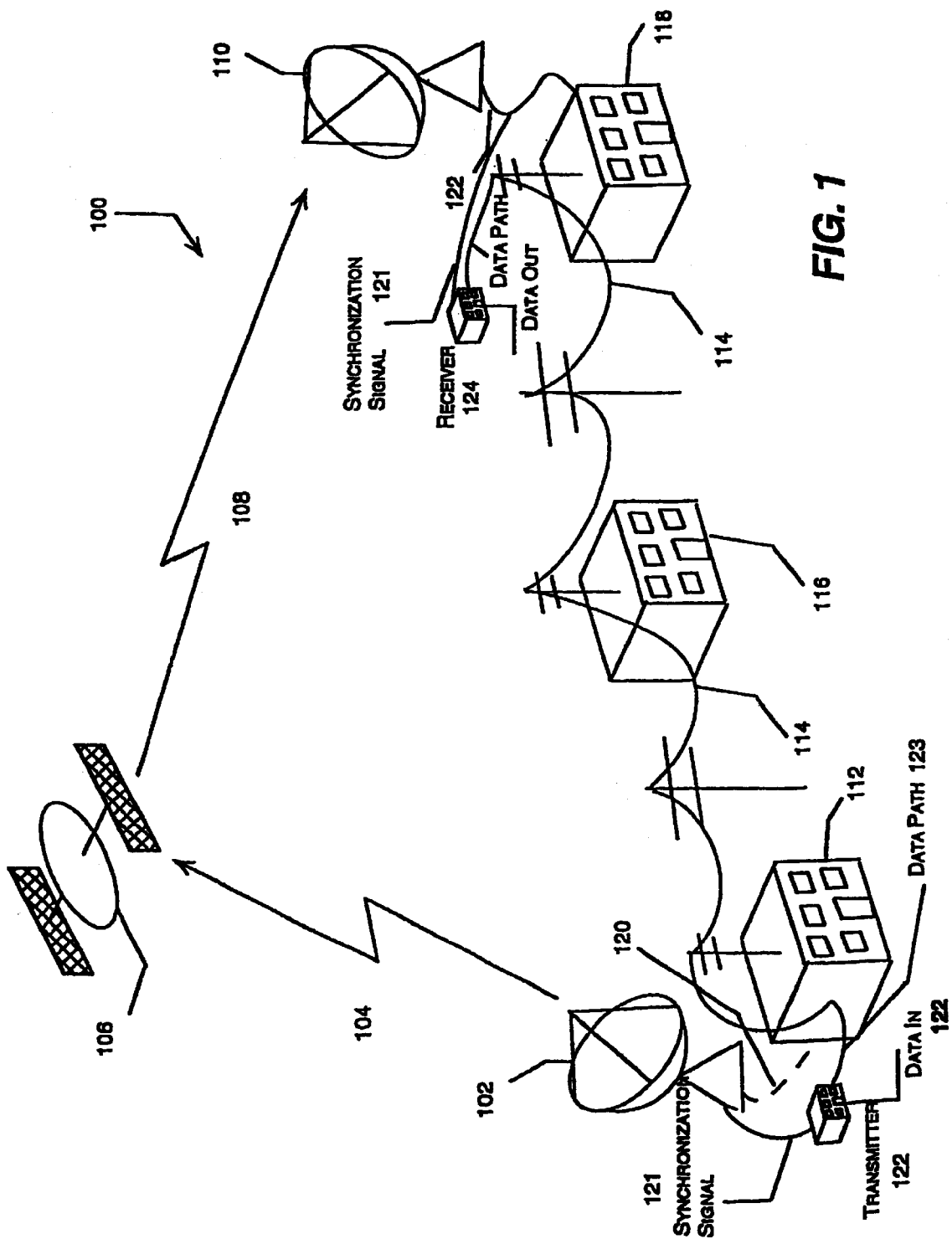
FIG. 1 is system-level diagram illustrating application of the preferred embodiment of the present invention.

According to the preferred embodiment, the present invention provides a system and methods that use separate paths to send amplified data. The method uses a technique to expand, or amplify, the amount of data that can be transmitted over a dedicated bandwidth-limited communications medium by using a separate channel for transmitting a SCP signal. The SCP signal demarcates successive frames, with a pulse occurring at a predetermined position within the frame.

For purposes of this application, the term "bandwidth-limited communications medium" shall be interpreted to include a communications channel connecting two points A and B and any associated components of such a communications system which impose a limitation on the effective bandwidth of the communications system, such as the communications medium itself, any transmitting and receiving equipment, any associated switching circuits, noise effects, and any other elements that might constrain the bandwidth of a communication between points A and B. As an example, a fiber optic communications cable might be considered "wide-band" in that it has a bandwidth of several gigahertz. However, the associated receiver or transmitter for such a fiber optic cable may have a bandwidth of only several hundred megahertz. Therefore, the overall system would have an effective bandwidth of several hundred megahertz and thus be considered a bandwidth-limited communications medium.

The SCP signal is sent over a wide-band communications medium, such as a satellite communications link, from the video server to a receiver. The wide-band communications medium may be a dedicated line or a general broadcast. Data is converted to an n-bit digital data signal and transmitted simultaneously over a bandwidth-limited communications channel, such as twisted copper pairs, to the receiver. Synchronizing the high-frequency SCP with a lower frequency data rate creates a total of $2^n$ symbol positions for transmitting a data pulse. The number $2^2$ of symbol positions available for transmitting the data is directly related to the frequency of the SCP signal. The symbol positions are then grouped into a plurality of frames, where each frame transmits a single pulse at a rate not exceeding the bandwidth of the channel. Therefore the number of frames is equal to the bandwidth of the system. Each frame is then divided into $2^n$ symbol positions. A pulse is then placed in a symbol position that corresponds to the value of the data contained in the pulse. However, each pulse has a period equal to the frame length. Furthermore, each pulse has a preferred duty cycle of 50% which means that the length of each pulse is equal to half the frame length. Therefore, each pulse is equal to one half of the number of SCP signals in a frame. Because the period of the data pulses is long relative to the period of an individual SCP signal pulse, the period of an individual data pulse can overlap into the period of a subsequent pulse. When this occurs, the receiver will no longer be able to resolve the individual pulses. The present invention overcomes this problem by using a novel encoding scheme in which individual pulses which overlap adjacent pulses, are inverted. Inversion alleviates the overlap of adjacent pulses and also increases the rate at which data can be transmitted over a bandwidth-limited communications medium.

In operation, an input data signal is encoded into a PPM encoded output signal consisting of a series of n-bit pulses. Each pulse is analyzed to determine whether the pulse that is currently being transmitted is encroached by a "delay" from the period of the pulse that has been previously transmitted. A delay is the overlap, or encroachment of a pulse period from one frame into a subsequent frame. The delay is measured in terms of SCP signal positions and denoted as a fraction thereof. Depending on the delay of the previous PPM encoded output signal, one of four possible transmission scenarios may occur: (1) the current pulse may be inverted and shifted later in time relative to its original position in the current frame; (2) the current pulse may be inverted and shifted earlier in time relative to its current position in the current frame; (3) a blank may be inserted between the current pulse and the previous pulse; or (4) the PPM encoded output signal may be transmitted in its original state.

If a determination is made that encroachment occurs, the current pulse of the PPM encoded output signal is inverted and shifted later in time relative to its current position in its frame to eliminate the encroachment. In the event that inversion of the current PPM encoded output signal does not eliminate the encroachment, a blank is inserted between the current PPM encoded output signal and the previous PPM encoded output signal. A blank consists of a plurality of zero-value pulses inserted at each symbol position in a frame.

If a determination is made that encroachment does not occur, the current PPM encoded output signal may be inverted and examined whether inversion will shift the PPM encoded output signal earlier in time relative to its position in the frame to minimize the delay imposed on the subsequent PPM encoded output signal. If the current PPM encoded output signal cannot be shifted earlier in time through inversion, the PPM encoded output signal is transmitted in its original state.

The SCP signal is a general broadcast clock pulse or a timing signal provided over a dedicated channel and used for synchronization. For one-way communications, such as video on demand, the data sender of the video service provider may generate the timing signal. The timing signal may also come from an independent source that can be shared or received by both the sender and receiver of the data.

In the preferred embodiment, the SCP signal is transmitted through a satellite transmission. The wide bandwidth used by satellite link makes it ideal for transmitting a high-frequency clock synchronization signal. Also, the hardware required for receiving a satellite transmission is well developed. Satellite-receiving antenna systems are readily available in the consumer market and are relatively inexpensive. The cost of these systems is kept to a minimum because they are not required to handle large volumes of information. They are only required to handle one channel that transmits the SCP signal. This requirement eliminates most of the components and costs associated with typical satellite broadcast receivers. However, those skilled in the art will appreciate that other wide-band transmission systems, such as, but not limited to, microwave transmission systems, optical transmission systems, and coaxial cable transmission systems, can be used to functionally transmit a clock synchronization system in conjunction with the present invention.

A system constructed as disclosed herein is synchronized by first transmitting a predetermined series of symbols to allow a receiver to determine the delay between the SCP signal transmission and the data transmission. In the preferred embodiment, the SCP signal is sent over a satellite transmission path and the data is sent over a twisted copper pair telephone line. The system sends codes that match the pulse position on the transmitter side. The system preferably sends one positive pulse at SCP signal position 0, two negative pulses at SCP signal position 1, three positive pulses at SCP position 2 and so on. This allows the receiver to synchronize to the transmitter's symbol positions while calculating the delay between the between signal paths and compensating for this delay.

The system then tests for frequency delays by sending several series of pulses over the band-width limited communications medium in which the frequency that the pulses are transmitted is varied from one series to another. Although the transmission frequencies never exceed the bandwidth of the line, they vary at frequencies below the maximum bandwidth. The frequency delays introduced by the corresponding frequency changes are accounted for and stored in the transmitter controller 208. Thus, in future transmissions, the transmitter can compensate for the calculated frequency induced delays during transmission.

This synchronization scheme allows a receiver to synchronize itself to the transmitter's symbol positions while at the same time calculating the delay between the clock synchronization signal and the data signal.

The next step in the synchronization process is for the transmitter to send every possible combination of two pulse blocks, including the delays, over the data transmission medium so that the delays are recognized and accounted for. Using SPAD-3 as an example, the system would transmit 512 possible combinations of two pulse blocks. The combinations are made up of 8 symbol positions per pulse and 8 possible delays (8×8×8=512). Therefore, for SPAD-n systems the total number of possible two pulse block combinations would be equal to $(2^n)^3$. This allows the transmitter, not the receiver, to compensate for the delays.

Once synchronization is achieved between the transmitter and receiver, the preferred system begins to send data over the bandwidth-limited communications medium. In a typical application of the present invention, the bandwidth-limited communications medium will be standard twisted copper pairs, the backbone of the telephone network. Those skilled in the art will recognize, however, that other bandwidth-limited communications media, as defined for purposes of this application may be used to transmit data.

Data is received into the transmitter and held within a buffer. As data is transmitted, the data held in the buffer is transferred into an n-PPM encoder, where n is the number of bits used to encode the data (n is assumed to be three for purposes of illustrating the invention, although those skilled in the art will recognize that n can be any whole number value) into a PPM encoded output signal. Once in the n-PPM encoder, the data is first encoded as 3-bit data pulses. The pulses have a period equal to the frame length. The frame length is equal to the inverse of the bandwidth of the data communications medium. The preferred pulse length is at least one half of the pulse period, corresponding to a 50% duty cycle. The pulse period and pulse length will preferably always be the same proportion, regardless of the communications medium chosen.

As the PPM encoded output signal is generated, the pulse periods of individual pulses may overlap the adjacent pulse period. Overlap occurs because each the period of each pulse is equal to the frame length. Therefore, whenever an individual pulse occurs in the latter half of the frame, the pulse period will overlap into the subsequent frame. When this occurs, the receiver cannot distinguish individual pulses and the output data signal will be indistinguishable. To alleviate any possible overlap of two adjacent pulse periods, a pulse may be "inverted." Pulse inversion has the effect of shifting the pulse period in time to avoid overlap and provide sufficient separation between individual pulse periods of the transmitted data signal so that the receiver can distinguish successive pulse periods. Inverting the pulse to be transmitted may sufficiently shift the pulse period later in time relative to its original position in the frame to eliminate any overlap. However, there may be circumstances when inversion of the current pulse period is insufficient to eliminate the overlap between the current pulse period and the previous pulse period. In these circumstances, a "blank" may be inserted between the two pulses. Inserting a blank requires transmitting a zero value pulse for each SCP signal for an entire frame. The insertion of a blank creates sufficient separation between the two successive pulse periods so that they may be distinguished by the receiver.

Inversion of pluses may also reduce the "delay" of individual pulse periods. Delay is the overlap, or encroachment of a pulse period into the next subsequent pulse period. By inverting the current pulse and shifting it earlier in time relative to its original position in the frame, the delay, or encroachment caused by the pulse period can be reduced, or eliminated. Therefore, by reducing the delay of individual pulses, the rate at which data may be transmitted over a bandwidth-limited communications channel can be increased.

To begin encoding the digital data an individual pulse of the PPM encoded output signal to be transmitted at a time $t_0$ is transferred to a transmit buffer. The individual pulse is compared to determine if the pulse needs to be inverted. Inverting a pulse means that the pulse amplitude is negated, relative to a zero voltage, and the position of the pulse is converted to its complementary value. The complementary value is determined by dividing the number of symbol positions by two and associating the values of $0, 1, \ldots, (2^n/2)-1$ to the corresponding values of $(2^n/2), (2^n/2)+1, \ldots, 2^n$. For $n=3$ as illustrated, the values for SPAD-3 are represented in Table 1.

TABLE 1

Pulse Positions and Complementary Pulse Positions for SPAD-3.

| Pulse Value | Complementary Pulse Value |
|---|---|
| 0 | 4 |
| 1 | 5 |
| 2 | 6 |
| 3 | 7 |
| 4 | 0 |
| 5 | 1 |
| 6 | 2 |
| 7 | 3 |

The rationale for inverting pulses is to shift each pulse to a position as early in the frame as possible without causing an overlap with the pulse in the previous frame. By shifting the pulses in this manner, delays, which the pulse at time $t_0$ would impose, on the pulse transmitted at time $t_1$ is minimized. For illustrative purposes, the time $t_0$ is the time that the current pulse is being transmitted, time $t_1$ is the time that the first subsequent pulse is transmitted, and time $t_{-1}$ is the time that the previous pulse was transmitted. The value of the current pulse is compared with the delay from the pulse transmitted at time $t_{-1}$ to determine if an overlap occurred. If no overlap between the two pulses occurs, the pulse at time $t_0$ is inverted to determine: 1) whether the complementary pulse value is less than the original pulse value; and 2) whether an overlap occurs with the delay from the pulse transmitted at $t_{-1}$. If the complementary pulse value is greater than the original value of the pulse, the original pulse value is transmitted. This is because inverting the pulse at $t_0$ would increase the delay imposed on the pulse at $t_1$.

If the complementary pulse value is less than the original pulse value, the process then determines whether the delay of the transmitted data signal at $t_{-1}$ overlaps the inverted pulse period of the transmitted data signal at $t_0$. If no overlap occurs between the delay from the transmitted data signal at $t_{-1}$ and the pulse period of the transmitted data signal at $t_0$, the inverted pulse is transmitted over the bandwidth-limited communications medium. However, if inverting the PPM encoded data signal at $t_0$ causes an overlap to occur between the pulse at $t_0$ and the delay from the transmitted data signal at $t_{-1}$, the PPM encoded data signal at $t_0$ is transmitted.

If the determination is made that an overlap occurs between the transmitted data signal at $t_{-1}$ and the PPM encoded data signal at $t_0$, a determination is made whether inverting the PPM encoded data signal at time $t_0$ would prevent the overlap. If inversion of the PPM encoded data signal shifts the value sufficiently later in time to alleviate the overlap, the complementary pulse value is transmitted. However, if the inversion is insufficient to nullify the overlap or the inversion increases the overlap, a blank is inserted between the transmitted data signal at $t_{-1}$ and the PPM encoded data signal at $t_0$. A blank consists of no PPM encoded data being transmitted for an entire frame. The insertion of blanks gives the system a moment between pulses to reset itself and eliminate the build-up of delay.

Error detection can be handled by one of a number of methods generally known in the art. The preferred method of error detection used in the present invention is Cyclic Redundancy Checking (CRC). Another method, but not a limitation, of error checking that could be employed by the present invention is forward error correction. Those skilled in the art will recognize that other means of error checking exist and may be used in the implementation of the present invention.

FIG. 1 and the following discussion provide a description of the preferred method in which the preferred invention may be implemented. The invention will be described in the context of a 3-bit pulse position modulation system. Those skilled in the art will recognize, however, that the invention may also be implemented using PPM modulation schemes using more than 3 bits.

Exemplary embodiments of the invention are described below with reference to the appended figures. In this description, like elements are indicated by like element numbers throughout the several figures. FIG. 1 illustrates an environment 100 in which the preferred embodiment of the present invention would operate. A satellite dish 102 transmits a SCP signal over a communications channel 104 to an orbiting satellite 106. The SCP signal marks frames of pulse position modulated (PPM) data that is transmitted over a separate path. The satellite 106 relays the SCP signal down to a receiving satellite antenna 110 over a communications channel 104. The SCP signal can be generated at a transmitter 122 or it can be generated at a separate facility 112 that is linked to the transmitter 122 through a data path 123. The receiving satellite antenna 110 is connected to the receiving station 118 by a communications channel 122.

Subsequent to transmission of the SCP signal, the transmitting station 112 transmits the data signal over a bandwidth-limited communications channel 114, such as twisted copper pair telephone wires. The data signal is received at the receiving station 118 where it is synchronized with the SCP signal so that the pulse contained in the data signal can be extracted. If the distance from the transmitting station 112 to the receiving station 118 is so great such that the data signal begins to attenuate so that it cannot be detected at the receiving station 118, a repeater station 116 may be employed. The repeater station 116 receives and retransmits the data signal over the bandwidth-limited communications channel 114. Typically, twisted copper pairs cannot be separated by more than 18,000 to 24,000 feet between transmitting station 112 and the receiving station 118 or the repeater station 116.

Figure 2:
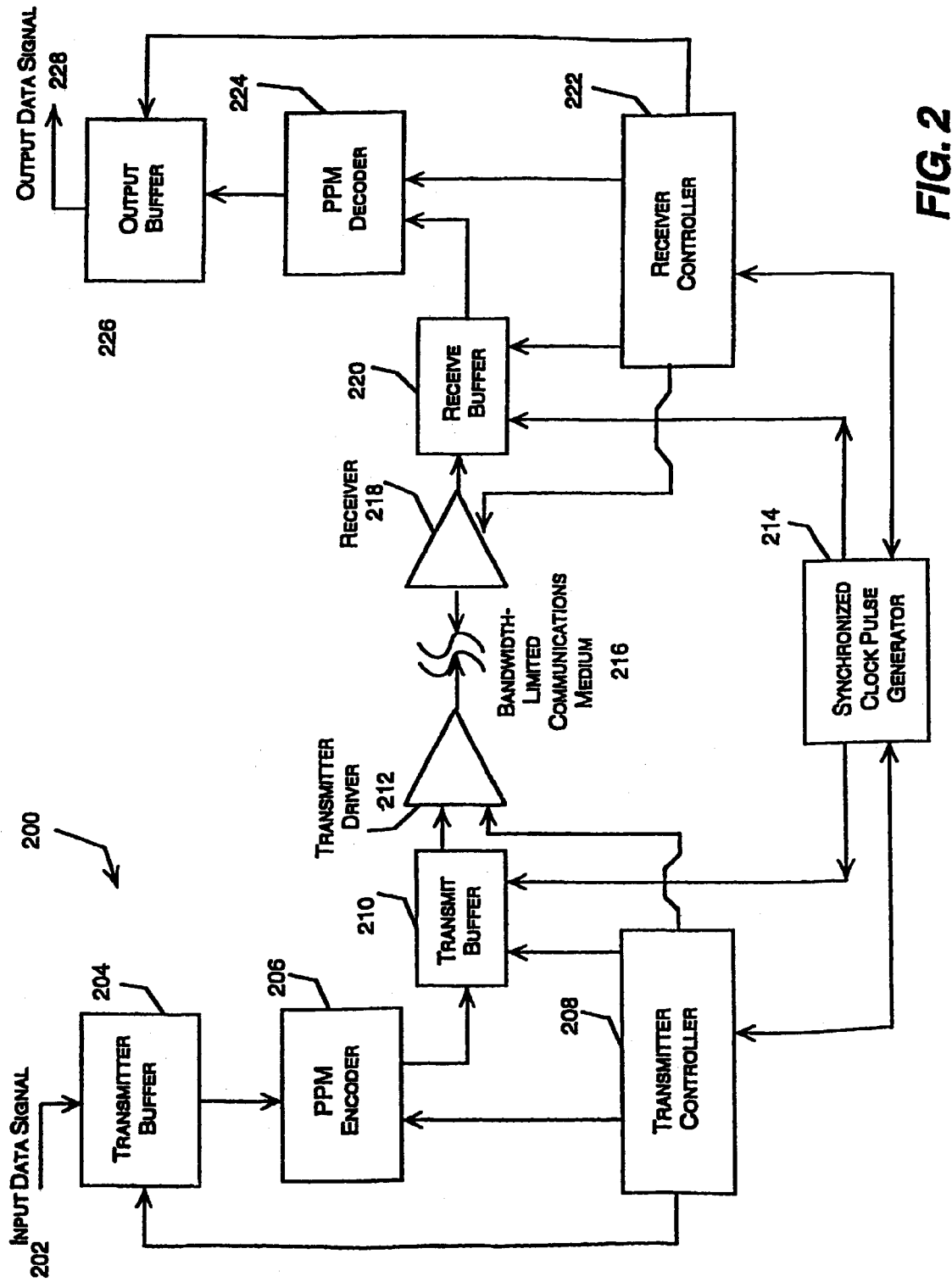
FIG. 2 is a block diagram illustrating the preferred embodiment of a system-level apparatus for transmitting and receiving an n-SPAD signal.

FIG. 2 is a block diagram of a system constructed in accordance with the preferred embodiment of the present invention. An input data signal 202 that is to be transmitted is input into an input data signal buffer 204. The input data signal buffer 204 receives control signals from a transmitter controller 208 to pass the data into a PPM encoder 206. The transmitter controller 208, which is a microprocessor, receives the SCP signal from a synchronized clock pulse generator 214 and determines the number of symbol positions that correspond to the SCP signal. The transmitter controller 208 then calculates the number of bits, n that correspond to the number of symbol positions and passes it to a PPM encoder 206. The PPM encoder encodes the input data signal 202 into a plurality of n-bit pulses and passes them, one at a time, to a transmit buffer 210. The transmit buffer 210 compares the current pulse with any delay from a previously transmitted pulse and determines whether the current pulse should be inverted.

Once the inversion of the pulse is completed, if required, the pulse passes to the transmitter driver 212 where it is transmitted across the bandwidth-limited communications medium 216. The transmitted signal is received by the receiver 218 and passed on to a receive buffer 220. The receive buffer 220 holds the received pulse while a determination is made whether the pulse has been inverted. The receive buffer 220 receives control signals from a receiver controller 222, which is a microprocessor, and also receives the SCP signal 214. The control signals are used to remove any inversion that the pulse may have undergone. Once the received pulse is restored to its original value it is transferred to a PPM decoder 224 where it is decoded to form n-bit data. Once the pulses have been decoded into n-bit data, the data is transferred to an output buffer 226 where it is held until it is output as an output data signal 228.

Figure 3:
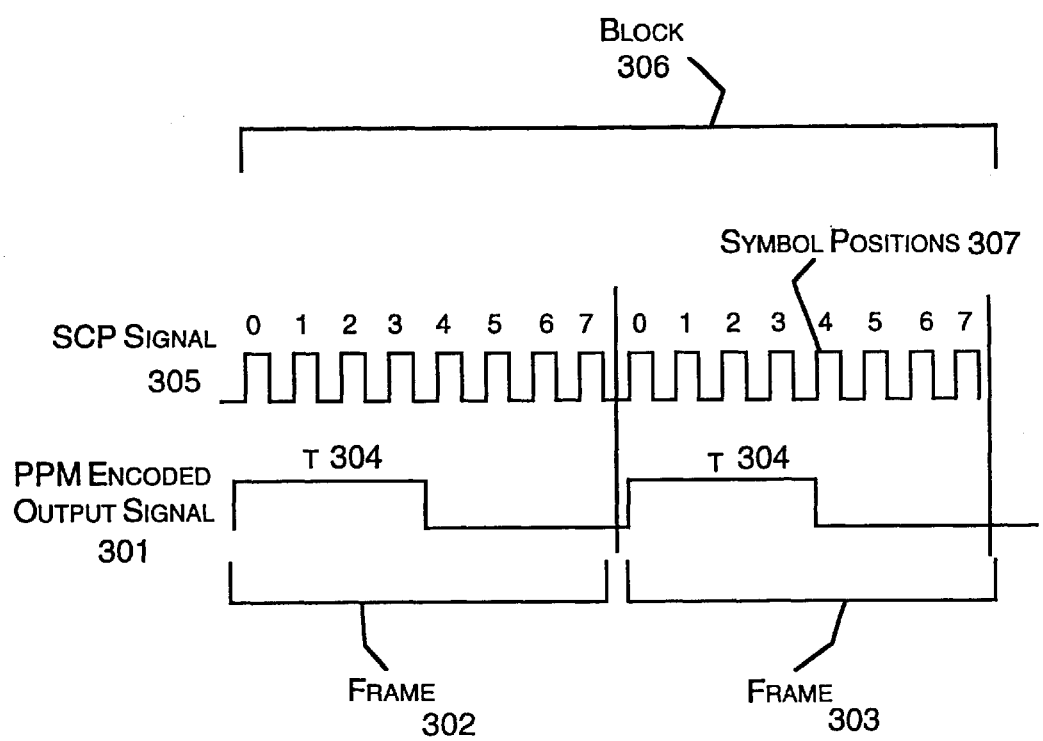
FIG. 3 is a timing diagram illustrating the relationship between the SCP signal, the symbol positions, the pulse period, the pulse width, the frame width, and the block width.

FIG. 3 illustrates the relationships between the pulse width, the pulse period, a frame, a block, and the SCP signal. A predetermined plurality of SCP signal pulses 305 define a frame of data, e.g. 302, 303. In a system such as illustrated in FIG. 3 where n=3, there would be $2^3$=8 symbol positions, and therefore every 8 SCP signal pulses defines another frame of data. The coincidence of a data pulse 301 relative to one of the SCP signal pulses 305 determines the value of the data transmitted.

A data pulse 301 preferably has a 50% duty cycle in relation to a frame. Each data pulse has a period T 304 that is equal to the frame width. The pulse width t-304 is preferably equal to one half of the frame width (50% duty cycle). The frame width is related to the number $2^n$ symbol positions 307, e.g. 8 SCP signal pulses define the frame. It will therefore be understood that the number of symbol positions is equal to the number of SCP signal pulses 305. Finally, two frames, or two pulse periods, make a block 306.

Figure 4:
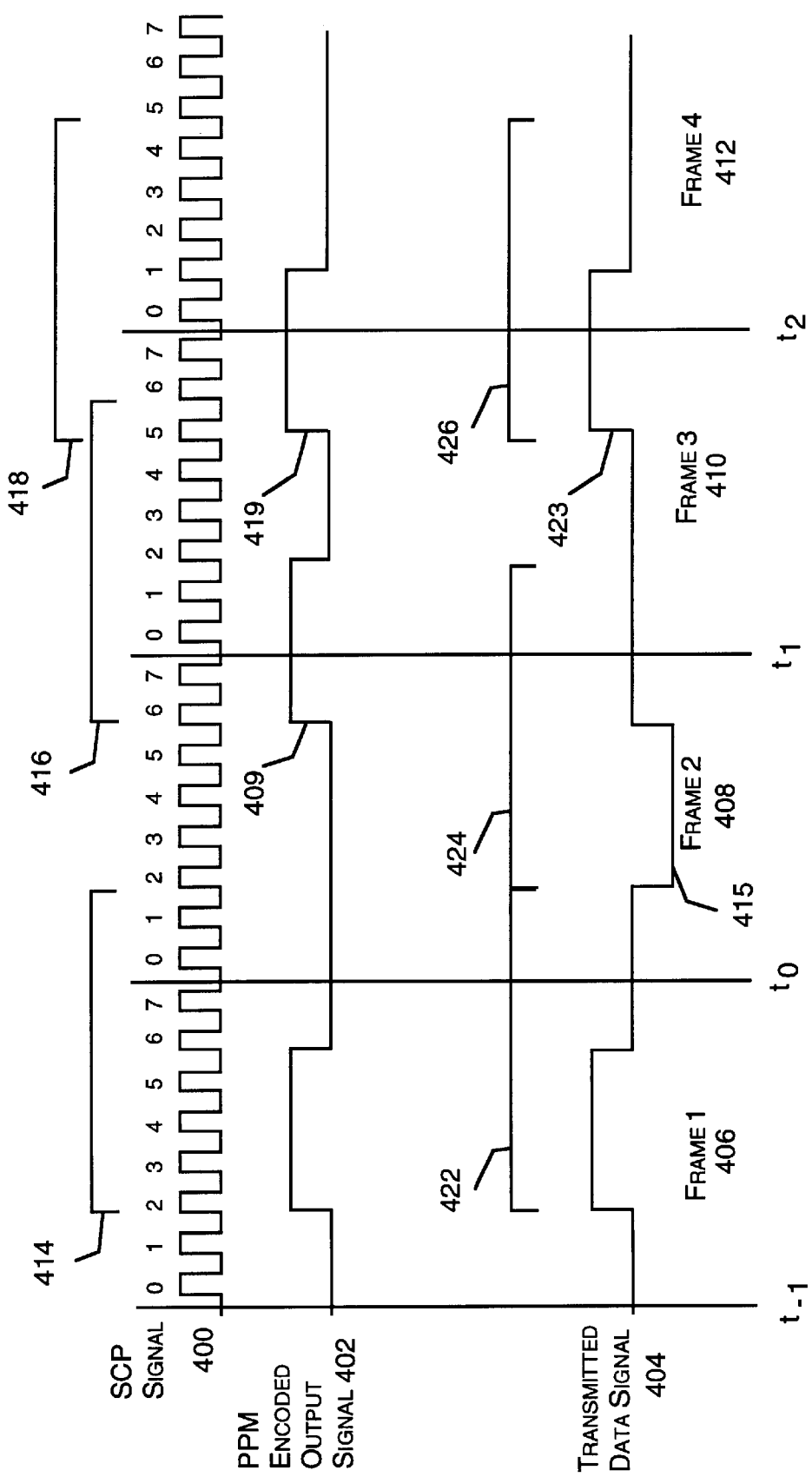
FIG. 4 illustrates an example of pulse inversion in the disclosed embodiment of the present invention.

FIG. 4 illustrates the manner in which the preferred embodiment of the present invention inverts pulses for transmission in response to certain conditions. FIG. 4 shows an input data signal 402 and a resultant transmitted data signal 404 for four frames (406, 408, 410, and 412). As in FIG. 3, each frame contains eight SCP signal pulses 400.

A first frame 406, which begins at a time $t_{-1}$, has an input pulse with the value 2 (i.e., the rising edge of the input data signal coincides with the occurrence of the SCP signal pulse at symbol position 2 in frame 1 406). The pulse period 414 of the first pulse extends into frame 2 408 by two SCP signal pulses causing a delay of 1/4 into frame 2 408.

Next, the value of the input pulse in frame 1 406 is examined to determine if inversion of the input pulse will cause a shift in symbol positions farther to the left. Reading from Table 1, the pulse value 2 has a complementary pulse value 6. Because the complementary value is greater than the original value, the input pulse is not inverted. Therefore, the transmitted pulse is identical to the input pulse and has the same pulse period 422.

The second frame 408, which begins at time $t_0$, contains the input pulse having the value 6 as indicated at 409. The pulse period 416 associated with the input pulse 409 begins at the sixth SCP signal pulse of frame 2 408 and extends six SCP signal pulses into frame 3 410, corresponding to a delay of 3/4 (6/8). Note that the delay from the first transmitted pulse period 422 of the first transmitted data signal does not overlap the pulse period 416 of the second input pulse. Accordingly, a determination is made whether inverting the second pulse would cause an overlap with the pulse period 422 of the first transmitted data signal. Again, reading from Table 1, the pulse value 6 corresponds to the complementary pulse value 2. Therefore, the inverted pulse does not overlap the period of the first pulse period 422 of the first transmitted data signal. The period of the inverted pulse begins at clock pulse two in frame 2 408 and extends two SCP signal pulses into frame 3 410, which corresponds to a delay of 1/4. Thus, inverting the second pulse reduced the delay by 1/2, or 4 SCP signal pulses.

Therefore, the transmitted data signal 404 reflects that an inverted pulse is transmitted in frame 2 408, as indicated at 415 in FIG. 4.

Frame 3 410 contains the input pulse that has the value 5, as indicated at 419. The period of the third pulse 418 does not overlap the period 424 of the inverted second pulse. Therefore, the determination is made whether inverting the third pulse will cause an overlap with the pulse period of the inverted second pulse 424. Once more, referring to Table 1, the pulse value 5 has the complementary pulse value 1. Inverting the third pulse and shifting it to the first symbol position would cause an overlap with the period of the inverted second pulse, which extends two SCP signal pulses into the third frame 408. Therefore, the third input pulse is left unchanged and is transmitted as indicated at 423 and the period 426 of the associated transmitted pulse extends five SCP signal pulse into frame 4 412, which corresponds to a delay of 5/8.

It will therefore now be understood that in certain predetermined conditions, the present invention involves inverting a pulse for transmission by complementing, for example by using a complementary table as in Table 1, and shifting the pulse earlier in time to minimize the delay after transmission of one pulse before the subsequent pulse is transmitted.

Figure 5A:
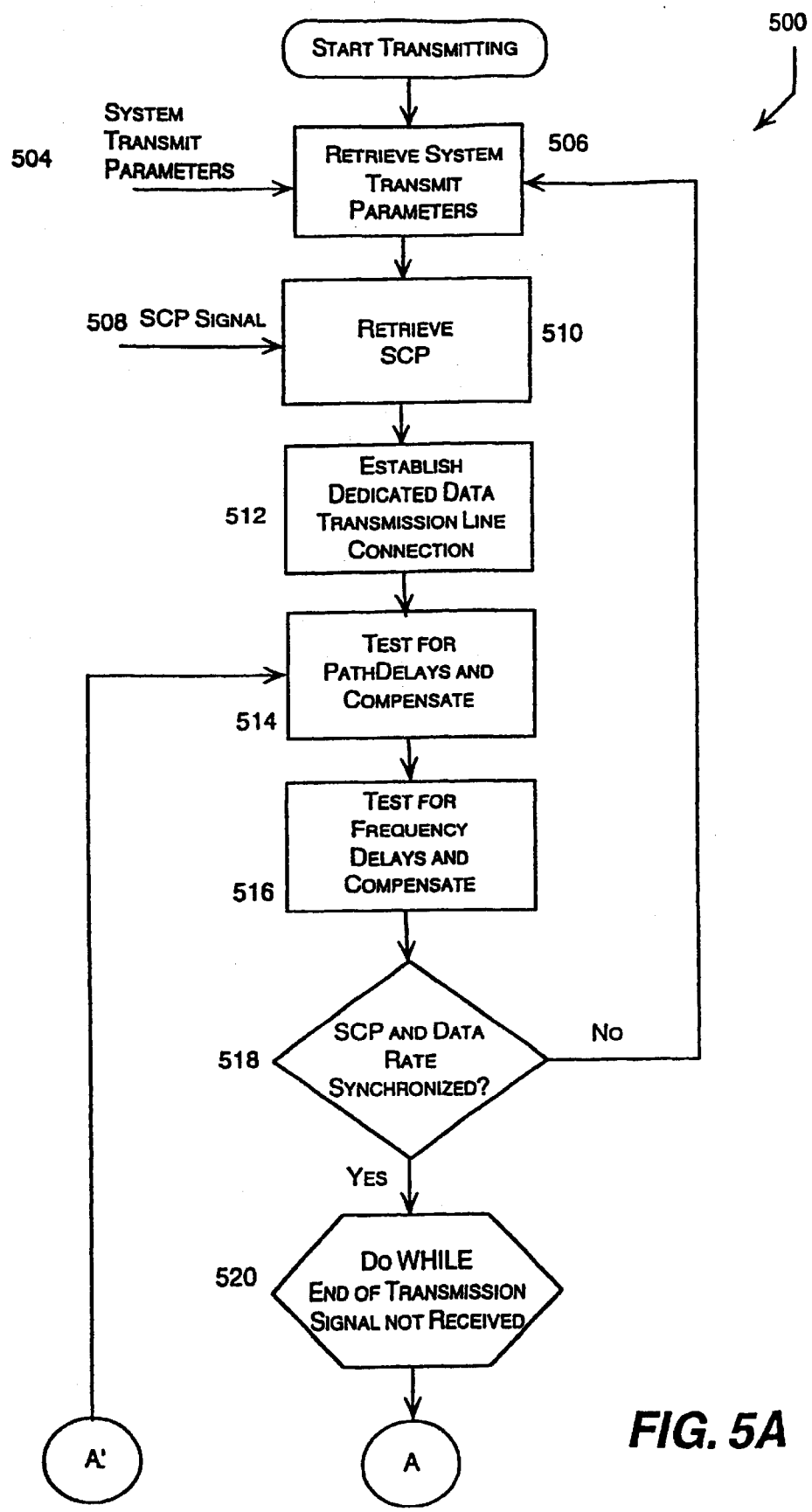
FIG. 5, consisting of FIG. 5A and FIG. 5B, is a flowchart illustrating how the transmitter generates a SPAD signal.
Figure 5B:
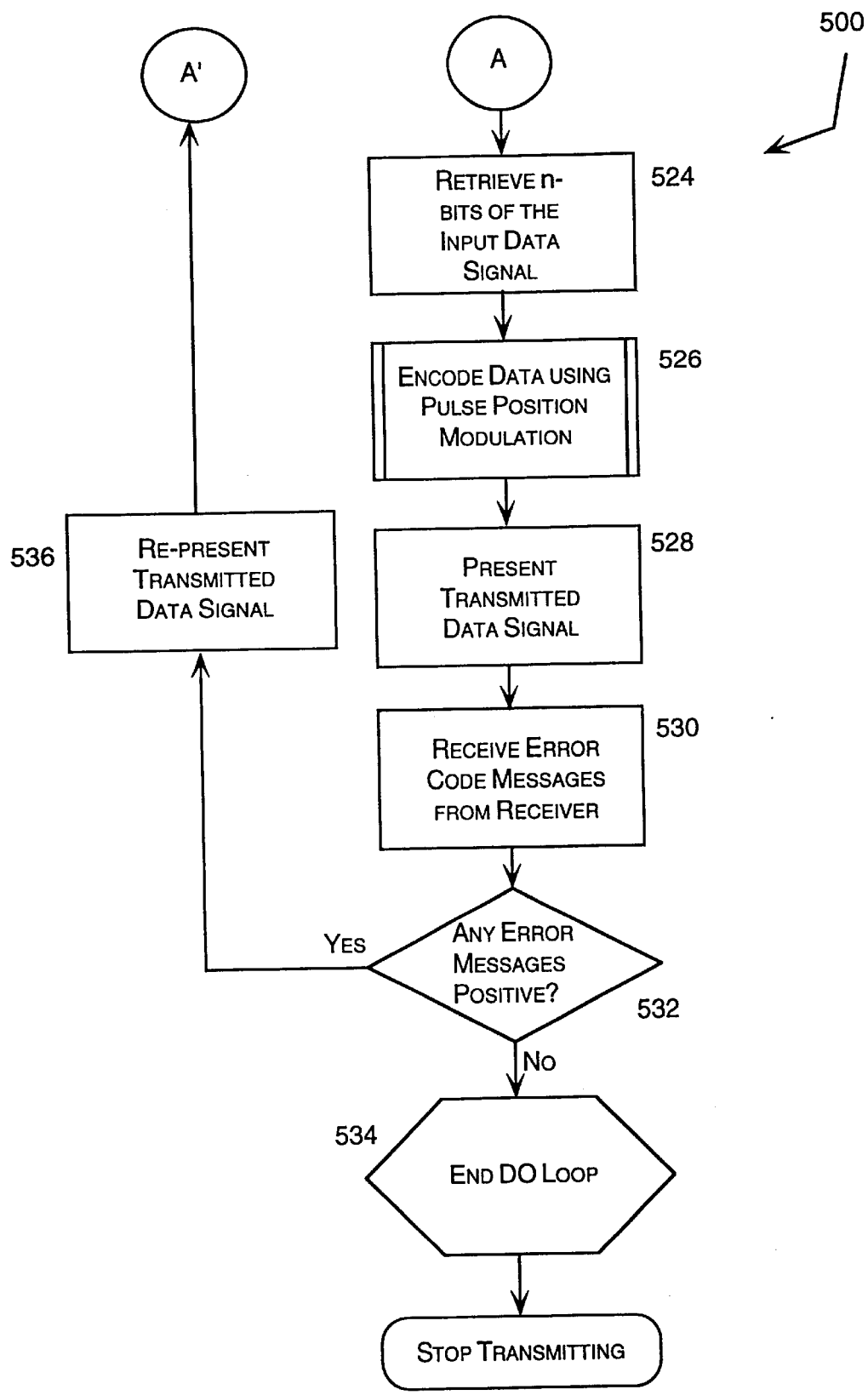

FIG. 5 is a flow diagram that illustrates the preferred transmission process 500 in accordance with the invention. The process 500 may be implemented as a controller in a system constructed as shown in FIG. 2. The first step 506 is for the transmitter to receive system transmit parameters which include pulse synchronization type, PPM line speed, and error detection type. The transmitter then receives the SCP signal at step 510

Step 510 is followed by step 512 in which the system establishes a dedicated data transmission line connection to the receiver. For illustrative purposes, it is assumed that the SCP signal is a satellite transmission and the data line transmission is a twisted copper pair.

Step 512 is followed by step 514, in which the system transmits a predetermined number of symbols to allow the receiver to calculate the delay between the SCP signal and the data line transmission. As one example of synchronization, the system sends one positive pulse at SCP signal position 0, two negative pulse at SCP signal position 1, three positive pulses at SCP position 2 and so on. This allows the receiver to synchronize to the transmitter's symbol positions while calculating the delay between the between signal paths and compensating for this delay.

Step 514 is followed by step 516, in which the system tests for frequency delays and makes any necessary compensation. The system tests for frequency delays by sending several series of pulses over the bandwidth-limited communications medium in which the frequency that the pulses are transmitted is varied from one series to another. Although the transmission frequencies never exceed the bandwidth of the line, they vary at frequencies below the maximum bandwidth. The frequency delays introduced by the corresponding frequency changes are accounted for and stored in the transmitter controller 208. Thus, in future transmissions, the transmitter can compensate for the calculated frequency induced delays during transmission.

Step 516 is followed by step 518, in which the determination is made whether the connection has been established. If the determination is made that a connection has not been established between the transmitter and receiver, the "NO" branch loops back to step 506, in which the system receives a new set of system parameters. However, if ate step 518 a the determination is made that that a connection between the transmitter and receiver has been established, the "YES" branch is followed to step 520, in which the system begins transmitting data.

Step 520 is followed by step 524, in which the system receives a message signal and converts it into n-bit data. Step 524 is followed by step 526, in which the input data signal is then encoded with pulse position modulation into a PPM encoded data signal. The data is checked to determine whether any of the PPM encoded data signal should be inverted and if any blanks should be inserted. Further details of the encoding process and the determination of inversion and blank insertion are provided in connection with FIG. 7 and the associated discussion.

Step 526 is followed by step 528, in which the pulses are transmitted over a bandwidth-limited communications medium. Step 528 is followed by step 530 where the transmitter checks for receipt of an error message sent by the receiver. If an error message is received from the receiver, the "YES" branch is followed to step 536, in which the system retransmits the pulse. If multiple error messages are received, the system returns to step 514 (see FIG. 5A) and reestablishes synchronization of the SCP signal and data signal. Once the data signal and SCP signal have been resynchronized, the system begins re-transmitting the data pulses.

Figure 6A:
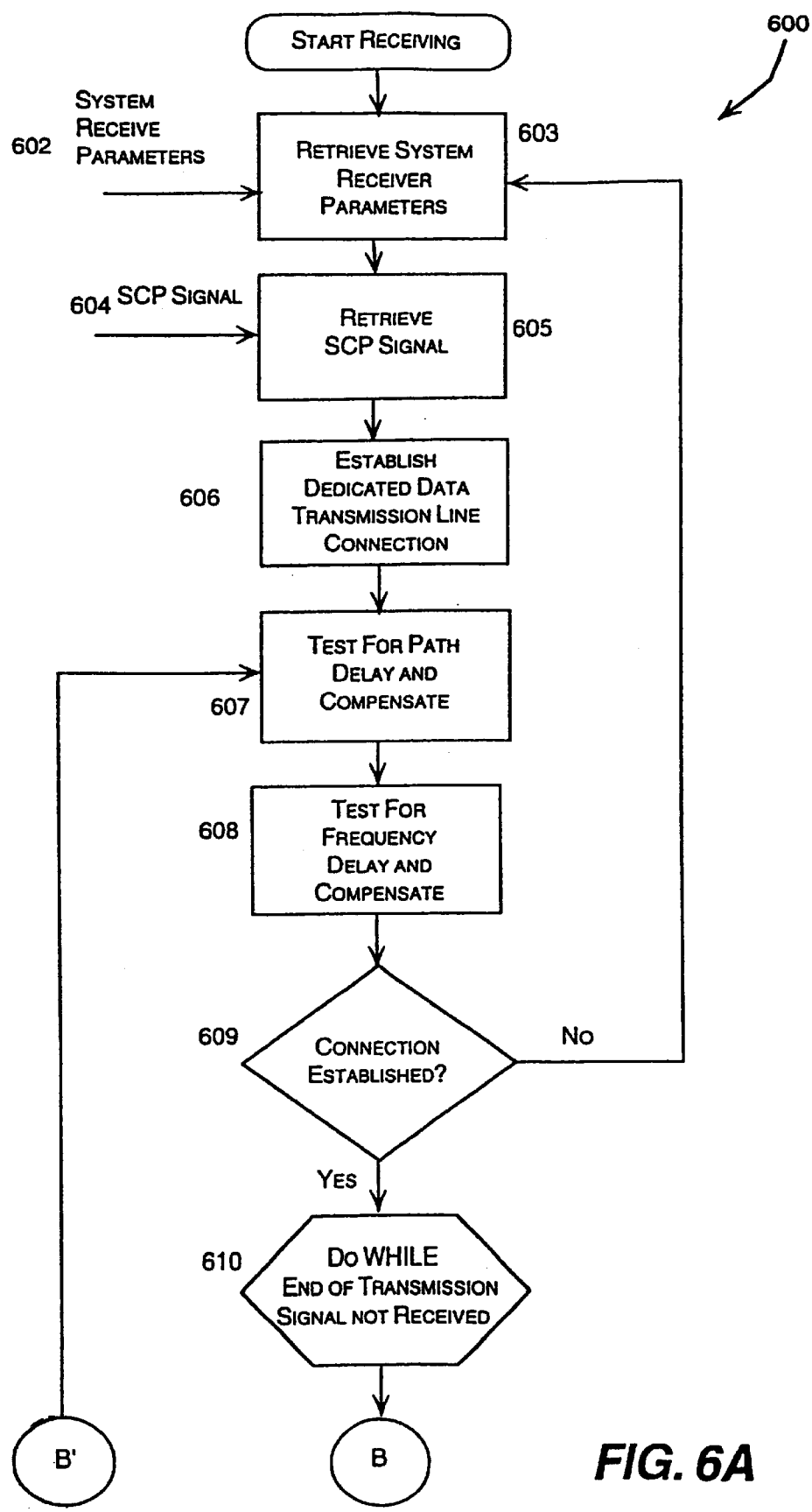
FIG. 6, consisting of FIG. 6A and FIG. 6B, is a flowchart illustrating how the receiver processes a SPAD signal.
Figure 6B:
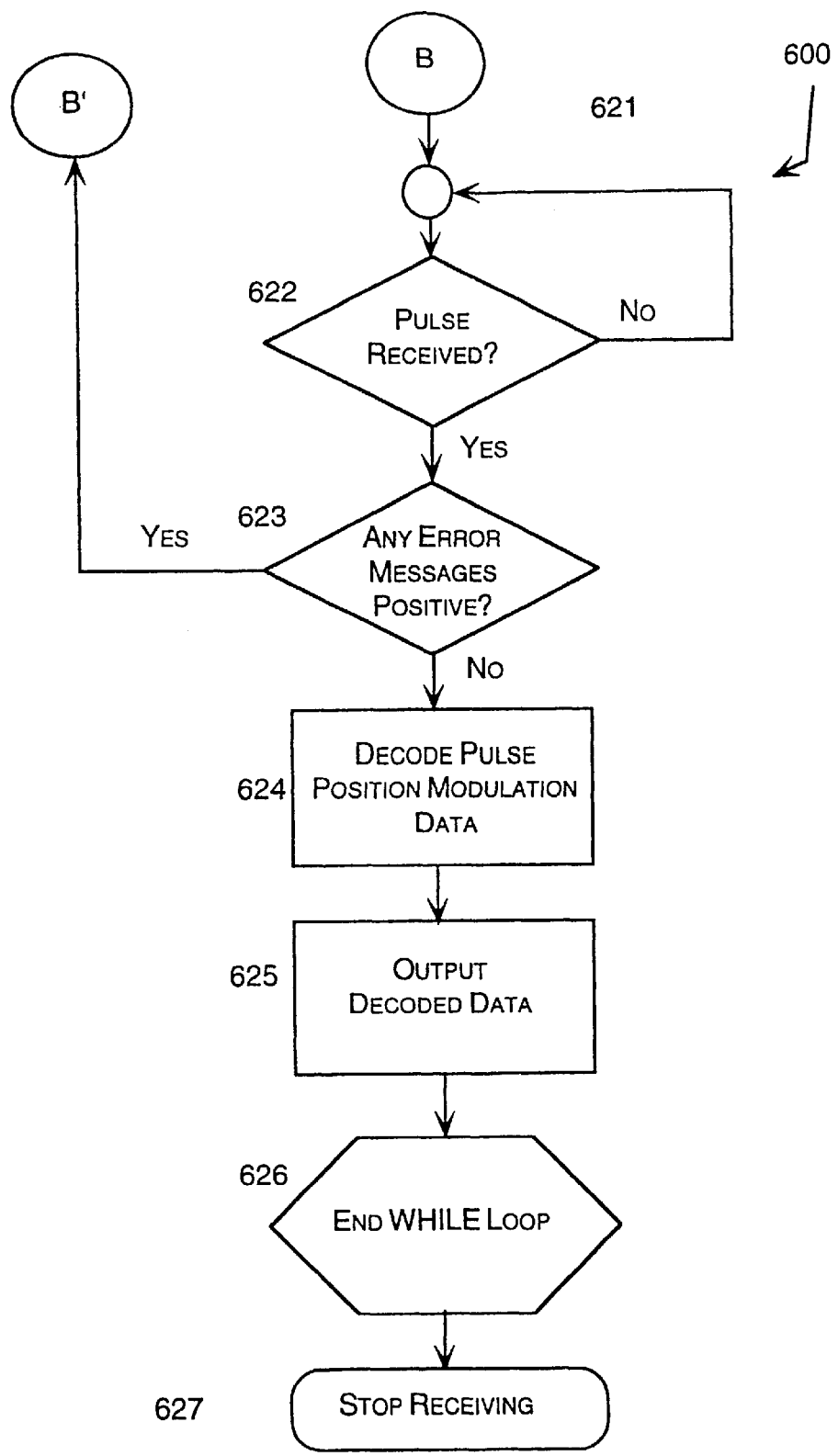

FIG. 6 illustrates a receive process 600 for a system constructed in accordance with the present invention. The receive process 600 begins at step 603, in which system parameters 602 are input into the receiver. The system parameters 602 includes the pulse synchronization type, PPM line speed, and error detection type. Step 603 is followed by step 605, in which the receiver retrieves the SCP signal.

Step 605 is followed by step 606, in which the receiver to establish the dedicated, bandwidth-limited data transmission line connection. Step 606 is followed by step 607, in which the receiver tests for path delays between the SCP signal and the transmitted data signal and compensates for the delays, as required. Testing and compensating for path delays is accomplished in the same manner as described for the transmitter.

Step 607 is followed by step 608, in which the receiver tests for and compensates for frequency delays. Testing and compensating for frequency delays is accomplished in the same manner as described for the transmitter, above. Step 608 is followed by step 609, in which a determination is made whether a connection was established. If the system determines that a connection was not established, the "NO" branch loops back to step 603, and a new set of system receive parameters are obtained. However, if the system determines that a connection was established with the transmitter, the "YES" branch is followed to step 610, in which the system begins receiving data transmissions while an end of transmission signal has not been received.

Step 610 is followed by step 611, in which a determination is made whether a pulse has been received. If a pulse has not been received, the "NO" branch loop back to step 611 until a data pulse has been received. If a determination is made that a pulse has been received, the "YES" branch is followed to step 612, in which a PPM data is decoded into an output data signal. Step 612 is followed by step 613, where the output data signal is presented.

Step 613 is followed by step 614, in which a determination is made whether an error message has been received. If the determination is made that an error message was received, the "YES" branch returns to step 607 where the data and the clock synchronization signal are resynchronized. If a determination is made that an error message was not received, the receiver continues receiving the transmitted data signal until and "end of message" signal is received at step 615.

Figure 7:
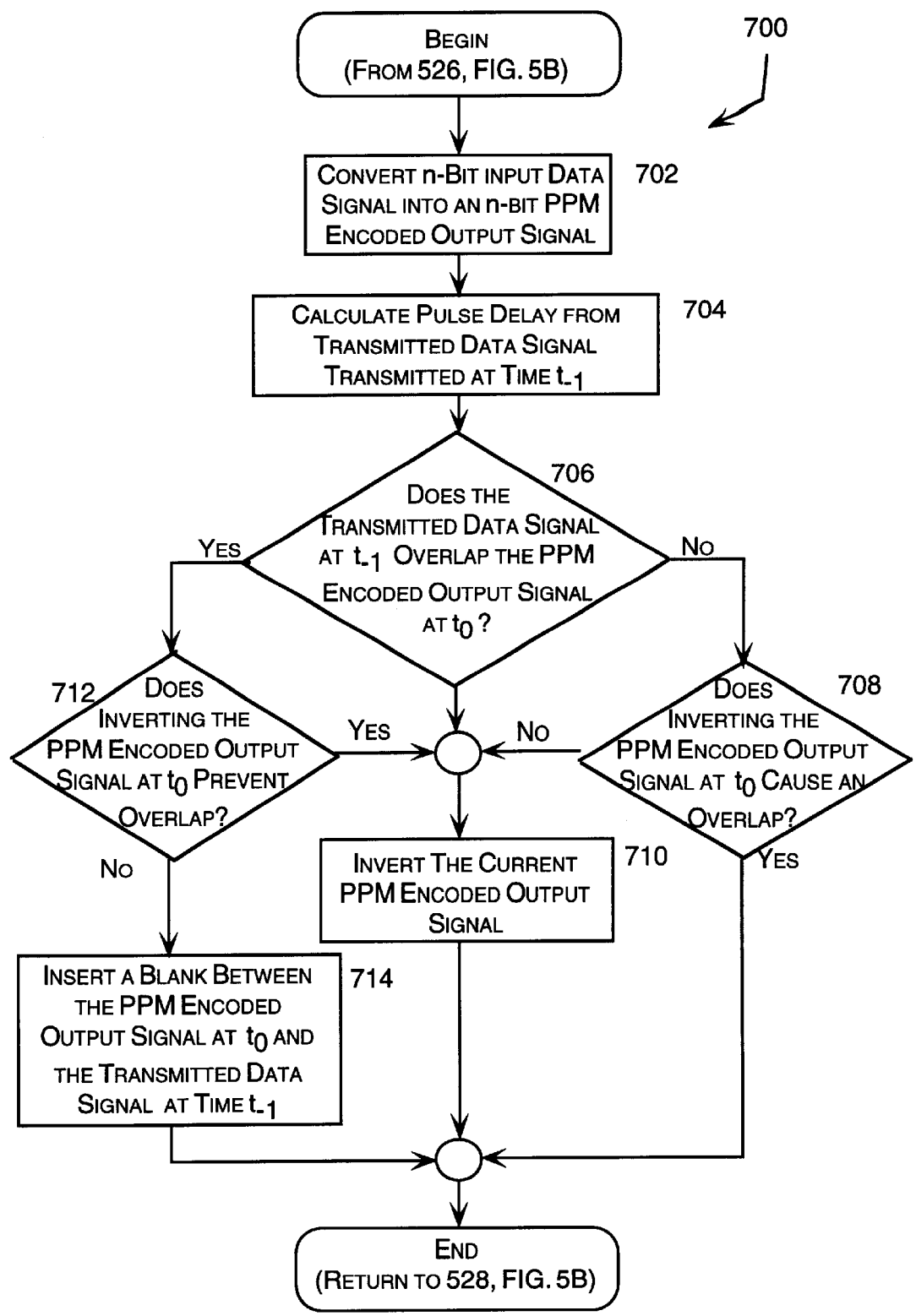
FIG. 7 is a flow chart illustrating the logic for pulse inversion in the disclosed embodiment of the invention.

FIG. 7 is a flow chart diagramming a process 700 to encode data using the preferred method disclosed here. The process 700 is a preferred process for carrying out step 526 in FIG. 5. The process begins at 702 in which n-bit data is converted into an n-bit PPM pulse. Step 702 is followed by step 704 in which any delay of the pulse from the previous frame is calculated. A delay occurs when the transmitted data signal transmitted at a time $t_{-1}$ overlaps the frame in which a PPM encoded output signal is transmitted at a time $t_0$. Step 704 is followed by step 706 in which a determination is made whether the delay causes the transmitted data signal transmitted at $t_{-1}$ to overlap the PPM encoded output signal transmitted at $t_0$. If a determination is made in step 706 that no overlap exist, the "NO" branch is followed to step 708, in which a determination is made whether inverting the pulse at $t_0$ would cause an overlap with the transmitted data signal in the previous frame at $t_{-1}$. The complementary value of the current PPM encoded output signal pulse value is calculated and compared to the original pulse value to determine which value is larger. If the complementary value is larger, the PPM encoded output signal at $t_0$ is not inverted because this would cause the it to shift to the right, which would introduce a delay, thereby decreasing the data rate. The "YES" path is followed to the "END" step, in which the routine returns to step 528 of FIG. 5.

Referring again to step 708, if the determination is made that the complementary value of the inverted PPM encoded output signal at $t_0$ is less than the original value of the non-inverted PPM encoded output signal, the determination is made whether the inverted PPM encoded output signal at $t_0$ overlaps the transmitted data signal at $t_{-1}$. If the determination is made that inverting the current PPM encoded output signal does not cause an overlap with the previous transmitted data signal, the "NO" branch is followed to step 710, in which the PPM encoded output signal at $t_0$ is inverted. Step 710 is followed by the "END" step, which returns to step 528 of FIG. 5.

Referring again to step 706, if the determination is made that transmitted data signal in the previous frame at $t_{-1}$ overlaps the PPM encoded data signal in the current frame at time $t_0$, the "YES" branch if followed to step 712, which determines whether inverting the PPM encoded output signal at $t_0$ will prevent overlap. If the determination is made that inverting the PPM encoded output signal at $t_0$, which shifts the pulse to the right, prevents overlap by the transmitted data signal transmitted at time $t_{-1}$, the "YES" branch is followed to step 710, in which the PPM encoded output signal at $t_0$ is inverted.

Referring back to step 712, if the determination is made that overlap between the transmitted data signal at time $t_{-1}$ and the PPM encoded output signal at $t_0$ cannot be prevented by inverting the PPM encoded output signal at $t_0$, the "NO" branch is followed to step 714, in which a blank is inserted between the period of the PPM encoded output signal at $t_0$ and the period of the transmitted data signal transmitted at time $t_{-1}$. Step 714 is followed by the "END" step, which returns the routine to step 528 of FIG. 5.

FIG. 8 is a look-up table 800 that is associated with an alternative embodiment of the present invention. In this alternative embodiment, pulse inversion and blank insertion may be implemented through a look-up table instead of through discrete logic or through a programmed controller. Certain implementations of the invention may be more efficient or more rapidly executable through a look-up table implementation rather than through logic or programming. Although FIGS. 8A–8M are directed specifically to SPAD-3 system, those skilled in the art will appreciate that similar tables can be derived for any n-bit system employing the SPAD technique.

The look-up table 800 illustrated in FIGS. 8A–8M are contained in computer-readable memory such as a read-only memory (ROM) module. The look-up table 800 is used in conjunction with two-word blocks of input data. The look-up table is arranged as a plurality of associated data values in column format including a "delay at start" 802, a "two word block to XMIT" 803 comprising a "first word" column 804, a "second word" column 806, an "invert word 1" column 808, an "invert word 2" column 810, a column indicating whether blank is inserted before the two-word block 812, a "1$^{st}$ word output" column 814, a "second word output" column 818, a column indicating whether to insert a blank between the "1$^{st}$ word output" 816 and the "2$^{nd}$ word output" 818 816, a column which contains the value of the "delay into the next block" 820, and a column containing a valued indicating the number of "bits per block" 822 transmitted by the "two word block to XMIT" 803.

In the alternative embodiment, the transmitter controller 208 retrieves both values of the two words in the transmit buffer 210 at a given time, $t_0$. The transmitter controller then uses the two values along with the delay from the two-word block at time $t_{-1}$ to locate the appropriate entry in the look-up table 800 stored within a memory device contained in the transmitter controller. The appropriate output values for the two words are retrieved and passed to the transmit buffer 210, where they are then transmitted over the bandwidth-limited communications medium 216. The corresponding delay is also retrieved from the look-up table 800 and retained in the transmitter controller 208. The delay is used in combination with the values from the two-word block at time $t_1$, to determine the corresponding output values in the look-up table 800 for the block at time $t_1$.

Figure 9A:
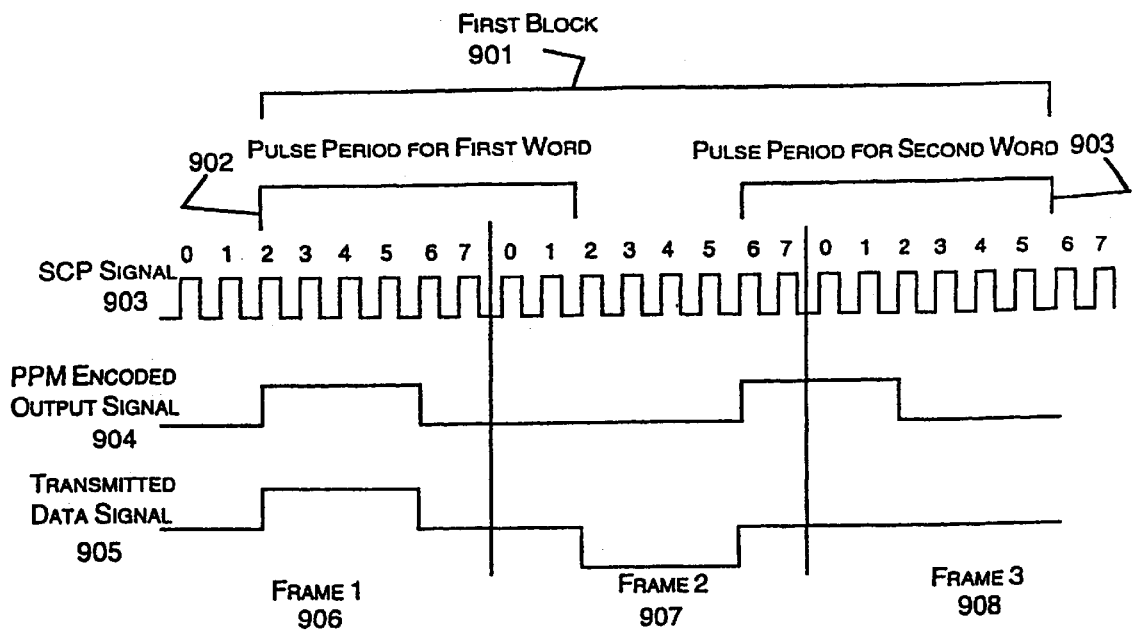
FIG. 9, consisting of FIG. 9A through FIG. 9C, are timing diagrams illustrating operation of the alternative embodiment using the look-up table.

FIG. 9 illustrates an example data transmission using the look-up table 800. The exemplary input data signal 904 consists of six, 3-bit words having the values 2, 6, 5, 7, 0, 4. The data values are grouped into two-word blocks. The first block 901 contains pulse period 902 which contains a PPM encoded output value 2 and pulse period 903 which contains the PPM encoded output value 6. Because the pulse period 902 is the first pulse of the input data signal 904, there is no delay resulting from a previous block. Therefore, the first block has no delay and the word values 2 and 6. This combination corresponds to line 25 830 of the look-up table 800 in FIG. 8. Reading across line 25 830 of the look-up table 800, it is seen the "delay at start" 802 contains the entry "none." Reading further along line 25 830, the "invert word 1?" column 808 contains the entry "no," indicating that the first output word is not inverted. Similarly, "yes" is present in the "invert word 2?" column 810, indicating that the second output word is inverted. Therefore, the output block will contain the output words each having the value 2, as indicated by the entries in the "1$^{st}$ word output" column 814 and "2$^{nd}$ word output" column 818, respectively. No blank is inserted before the two words as evident by the blank 1 in the "insert blank" column 812. Similarly, the "insert blank" column 818 contains the entry "no" indicating that a blank is not inserted between the "1$^{st}$ word output" 814 and the "2$^{nd}$ word output" 818. The delay into next block 820 column contains the entry "1/4" which corresponds to two SCP signal pulses, that extends into the next two-word block.

Figure 9B:
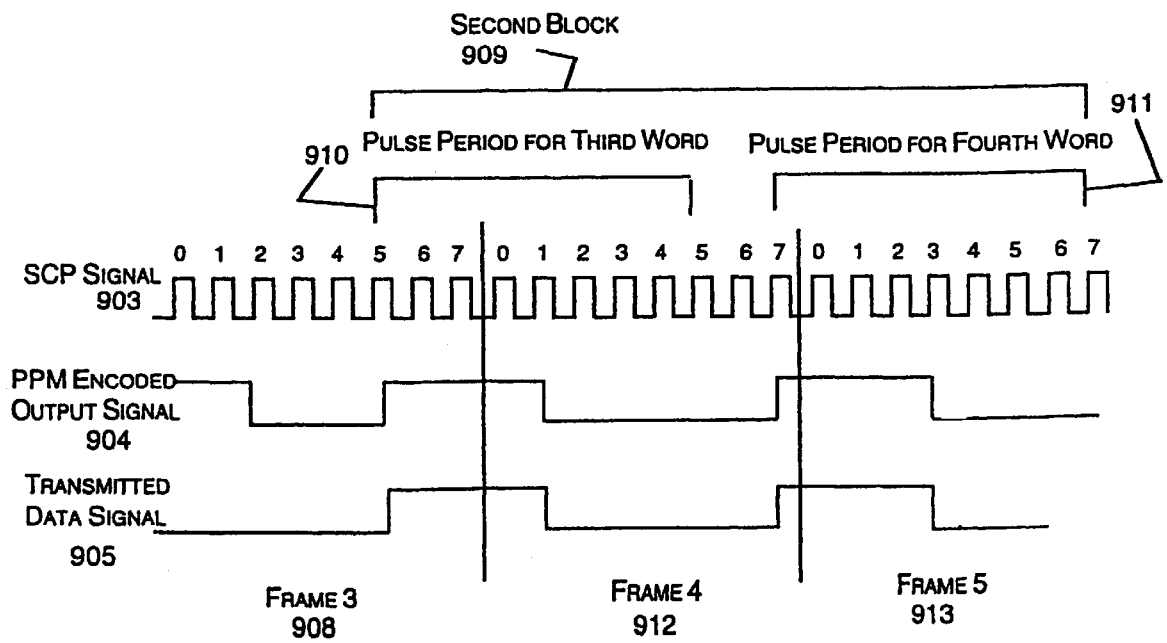
Figure 9C:
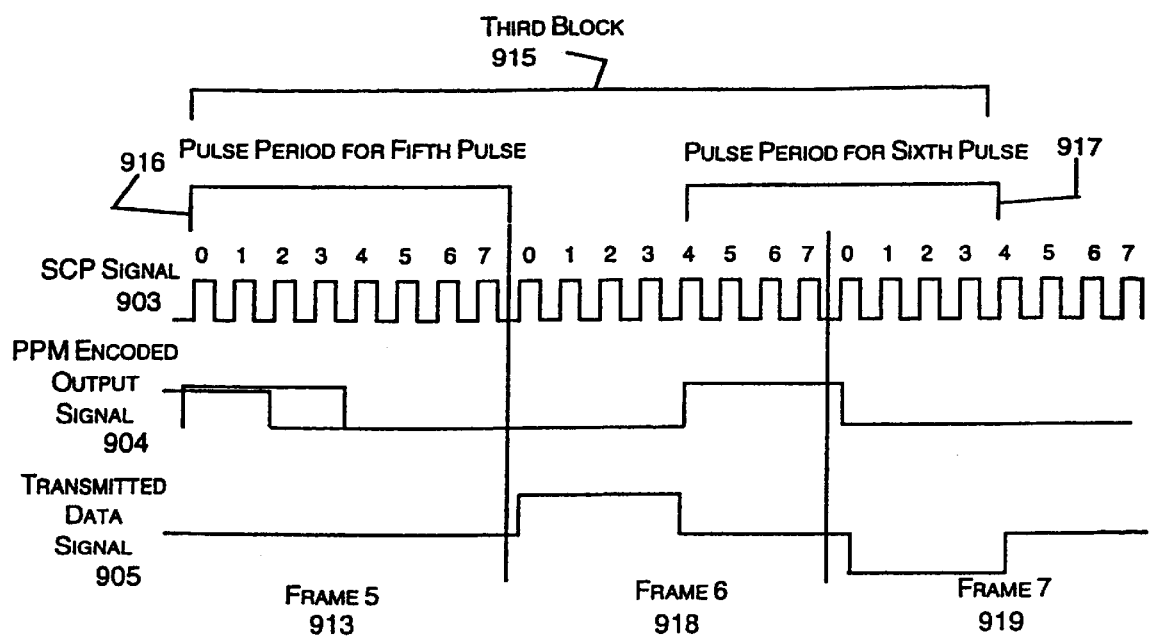

Once the first two-word block 901 containing the transmitted data signal is transmitted, the next two-word block 909 is analyzed (see FIG. 9B). The next two words 910 and 911 have the values 5 and 7, respectively. To locate the correct entry in the look-up table, the 1/4 delay from the previous block is used. Therefore, the correct entry, which corresponds to (1/4 delay, 5, 7), is located on line 178 840 of the look-up table 800 (FIG. 8E). Reading across the entry, it is noted that neither output word is inverted, nor are any blanks inserted between the two blocks or two words. It is also noted that a delay of 7/8 (corresponding to 7 clock pulses 903) is introduced. As shown by the last column 822 on line 178 840 of the look-up table 800, three bits of information per pulse have been transmitted.

The final block 915 (FIG. 9C) in the example is comprised of two words 916 and 917 having the values 0 and 4, respectively. The entry for these two words in combination with the 7/8 delay from the previous block 909 is found on line 455 850 of the look-up table 800 (FIG. 8K). Again, reading across the table from left to right, it can be seen from the entry in the "1$^{st}$ word output" column 814 that the value of the PPM encoded output signal in the fifth pulse period for the fifth pulse 916 is left unchanged. However, as seen from the entry for "2$^{nd}$ word output" column 818, the PPM encoded output signal for the pulse period for the sixth pulse 917 is inverted and has the complementary value 0 (Table 1, supra). Also, the entry "yes" in the "insert blank?" column 812 indicates that a blank must been inserted between the third block 915 and the second block 909. Thus, the effective data rate has decreased from three bits per pulse to two bits per pulse by the insertion of the blank because only two three-bit pulses are transmitted over three words. Therefore, it is believed that the effective average data rate for random data transmitted using a SPAD-3 system would be between two and three times the nominal data rate of a dedicated twisted copper pair.

The present invention thus provides a method to increase the amount of data that can be transmitted over a bandwidth limited communications medium. The method includes the use of a separate wide-band communications medium to transmit clock synchronization signals separately from the data. The method also uses a novel scheme to encode the data to increase the amount of data that can be transmitted. It should be understood that the foregoing pertains only to the preferred embodiments of the present invention, and that numerous changes may be made to the embodiments described herein without departing from the spirit and scope of the invention.

What is claimed is:

1. A method for transmitting data and thereby increasing the data rate of bandwidth-limited communications systems, comprising the steps of:
   transmitting clock synchronization signals over a first communications medium to a receiver;
   converting an input data signal into a plurality of digital values;
   dividing the period of the inverse of the maximum possible bandwidth in a second communications medium into a plurality of symbol positions; and
   providing a transmitted data signal in the second communications medium at a selected symbol position corresponding to the digital value of the input data signal.

2. The method of claim 1, further comprising the step:
   synchronizing the clock synchronization signal and the bandwidth-limited communications channel.

3. The method of claim 1, wherein the clock synchronization signal has a predetermined fixed rate equal to the bandwidth of the channel multiplied by $2^n$.

4. The method of claim 1, wherein the first communications medium is selected from the group comprising satellite transmission, optical fiber transmission, microwave transmission, and coaxial cable transmission.

5. The method of claim 1, wherein the second communications medium is selected from the group consisting essentially of a twisted copper pair telephone wire, an optical fiber, a microwave channel, a coaxial cable, and a radio frequency free-space channel.

6. The method of claim 1, further comprising the step:
   detecting an error in transmission of the data over the first communications medium.

7. The method of claim 1, further comprising the step:
   terminating the transmission of data over the first communications medium by transmitting no pulses for a plurality of symbol positions.

8. A method of encoding an input data signal for data transmission, comprising the steps of:
   calculating the delay of a first input pulse from the input data signal;
   calculating the value of a second input pulse from the input data signal;
   determining whether the delay of the first input pulse overlaps the second input pulse;
   in response to a determination that the delay of the first input pulse overlaps the second input pulse, inverting the second input pulse;
   determining whether the first input pulse overlaps the inverted second input pulse;
   in response to a determination that the first input pulse overlaps the inverted second input pulse,
      inserting a blank between the first input pulse and the second input pulse;
      transmitting the blank and the second input pulse over a bandwidth-limited communications channel;
   in response to a determination that the first input pulse does not overlap the second inverted input pulse, transmitting the inverted second input pulse over a bandwidth-limited communications channel; and
   in response to a negative determination that the first input pulse overlaps the second input pulse,
      inverting the second input pulse;
      determining whether the first input pulse overlaps the inverted second input pulse;
         in response to a positive determination that the first input pulse does not overlap the inverted second input pulse, transmitting the second input pulse over a bandwidth-limited communications channel; and
         in response to a negative determination that the first input pulse overlaps the inverted second input pulse, transmitting the inverted second input pulse over a bandwidth-limited communications channel.

9. The method of claim 8, wherein the step of inverting the input pulse comprises the steps of:
   negating the amplitude of the input pulse relative to zero voltage; and
   shifting the pulse position to a complementary position.

10. The method of claim 9 wherein the step of shifting the pulse to the complementary position comprises the steps of:
    dividing the number of symbol positions into an upper half and a lower half; and
    moving the original pulse position to a predetermined position in the opposite half of the frame.

11. The method of claim 10 wherein the step of moving the original pulse includes associating the values of 0,1, . . . , $(2^n/2)-1$ to the corresponding values of $(2^n/2)$, $(2^n/2)+1$, . . . , $2^n$.

12. The method of claim 8 wherein the step of inserting a blank comprises the steps of:
    refraining from initiating transmission of a pulse for a fixed number of synchronization clock pulses corresponding to the number of data symbol positions per frame.

13. A method for increasing the data rate of bandwidth-limited communications systems, comprising the steps of:
    transmitting a clock synchronization signal over a first communications medium to a receiver;
    converting a plurality of narrow band data signals into a plurality of n-bit digitally encoded values such that each of the values are representative of the corresponding narrow band data signals;
    integrating the pulse synchronization signal with a second communications medium having a fixed bandwidth, to create a plurality of symbol positions;
    inserting a plurality of pulses into a plurality of symbol positions such that each symbol position corresponds to a representative value of the corresponding data signals,
    dividing the plurality of symbol positions into a plurality of frames, each frame comprising $2^n$ symbol positions;
    performing a sequence comprising the steps of;
    calculating the delay of a first input pulse from an input data signal;
    calculating the value of a second input pulse from the input data signal;
    determining whether the delay of the first input pulse overlaps the second input pulse;
    in response to a positive determination that the delay of the first input pulse overlaps the second input pulse, inverting the second input pulse;

determining whether the first input pulse overlaps the inverted second input pulse;

in response to a positive determination that the first input pulse overlaps the inverted second input pulse, inserting a blank between the first input pulse and the second input pulse;

transmitting the blank and the second input pulse over a bandwidth-limited communications channel;

in response to a negative determination that the first input pulse overlaps the second inverted input pulse, transmitting the inverted second input pulse over a bandwidth-limited communications channel; and in response to a negative determination that the first input pulse overlaps the second input pulse, inverting the second input pulse;

determining whether the first input pulse overlaps the inverted second input pulse;

in response to a positive determination that the first input pulse does not overlap the inverted second input pulse, transmitting the second input pulse over a bandwidth-limited communications channel; and in response to a negative determination that the first input pulse overlaps the inverted second input pulse, transmitting the inverted second input pulse over a bandwidth-limited communications channel.

14. The method of claim 13, wherein the step of inverting the pulse comprises the steps of:

negating the amplitude of the pulse relative to a fixed reference voltage; and converting the pulse value a complementary value.

15. The method of claim 14 wherein the step of converting the pulse to the complementary value comprises the steps of:

dividing the number of symbol positions by 2 into an upper half and a lower half and associating the values of $0, 1, \ldots, (2^n/2)-1$ to the corresponding values of $(2^n/2), (2^n/2)+1, \ldots, 2^n$.

16. The method of claim 13, wherein the pulse synchronization signal has a predetermined fixed rate equal to the bandwidth multiplied by $2^n$.

17. The method of claim 13, wherein the first communications medium is selected from the group comprising satellite broadcast, a public broadcast transmission, an optical communications medium, and a microwave communications medium.

18. The method of claim 13, wherein the second communications medium is selected from the group consisting essentially of a twisted copper pair telephone wire, an optical fiber, a microwave channel, a coaxial cable, and a radio frequency free-space channel.

19. The method of claim 13, further comprising:

synchronizing the clock synchronization signal and the bandwidth-limited communications channel.

20. The method of claim 13, further comprising:

detecting an error in transmission of the data over the first communications medium.

21. The method of claim 13, further comprising:

terminating the transmission of data over the first communications medium by transmitting no pulses for a plurality of symbol positions.

22. A method for transmitting data from an input data signal over a bandwidth-limited communications medium and thereby increasing the data rate of transmission, comprising the steps of:

transmitting a clock synchronization signal over a first communications medium to a receiver, the clock synchronization signal defining a plurality of symbol positions relative to a frame, a pair of frames defining a block, with a data pulse occurring at a particular symbol position in a frame corresponding to a value of the input data signal;

storing in a memory a look-up table containing data values indicative of a information that a data pulse should be inverted and time shifted in response to predetermined conditions;

calculating the delay of a first block of a first pair of input pulses from the input data signal;

determining the values of a second pair of input pulses in a second block;

combining the delay of the first block and the values of the second pair of input pulses of the second block, wherein the combination corresponds to an entry in the look-up table;

locating the entry in the look-up table corresponding to the combination of the delay of the first block and the values of the second pair of input pulses;

retrieving from the look-up table a corresponding pair of output values and an associated delay value for the second pair of input pulses;

storing the associated delay in the memory;

replacing the second pair of input values with the retrieved corresponding pair of output values; and transmitting the retrieved pair of output values over a second bandwidth-limited communications medium as data pulses at symbol positions relative to the clock synchronization signal.

* * * * *